US006701093B1

United States Patent
Gotoh et al.

(10) Patent No.: US 6,701,093 B1
(45) Date of Patent: Mar. 2, 2004

(54) INTEGRAL TRANSMITTER-RECEIVER OPTICAL COMMUNICATION APPARATUS AND A CROSSTALK PREVENTIVE DEVICE THEREFOR

(75) Inventors: Tatsuo Gotoh, Tokyo (JP); Homu Takayama, Saitama (JP); Yoichi Kojima, Saitama (JP); Masakazu Yamagata, Saitama (JP); Shunichiro Wakamiya, Saitama (JP)

(73) Assignee: Pentax Precision Co., Ltd., Tokyo (JP)

( * ) Notice: Subject to any disclaimer, the term of this patent is extended or adjusted under 35 U.S.C. 154(b) by 0 days.

(21) Appl. No.: 09/354,732

(22) Filed: Jul. 16, 1999

(30) Foreign Application Priority Data

| Jul. 17, 1998 | (JP) | ............................................. 10-203765 |
| Jul. 21, 1998 | (JP) | ............................................. 10-204549 |
| Jul. 21, 1998 | (JP) | ............................................. 10-204550 |
| Jul. 21, 1998 | (JP) | ............................................. 10-204552 |
| Jul. 21, 1998 | (JP) | ............................................. 10-204553 |
| Nov. 25, 1998 | (JP) | ............................................. 10-333828 |
| Nov. 26, 1998 | (JP) | ............................................. 10-335826 |
| Mar. 25, 1999 | (JP) | ............................................. 11-81312 |
| Mar. 25, 1999 | (JP) | ............................................. 11-81344 |
| Mar. 25, 1999 | (JP) | ............................................. 11-081446 |
| Mar. 25, 1999 | (JP) | ............................................. 11-081479 |

(51) Int. Cl.⁷ ............................................. H04B 10/00
(52) U.S. Cl. ........................ 398/156; 398/135; 398/140
(58) Field of Search ................................ 398/156, 162, 398/140, 135, 182

(56) References Cited

U.S. PATENT DOCUMENTS

| 4,834,485 A | * | 5/1989 | Lee ......................... 350/96.19 |
| 5,844,231 A | | 12/1998 | Suzuki et al. ............ 250/201.2 |
| 5,856,663 A | | 1/1999 | Suzuki et al. ............ 250/201.2 |
| 5,856,664 A | | 1/1999 | Suzuki et al. ............ 250/201.2 |
| 5,872,661 A | | 2/1999 | Suzuki et al. ............... 396/104 |
| 5,883,730 A | * | 3/1999 | Coult et al. .................. 359/152 |
| 6,204,961 B1 | * | 3/2001 | Anderson et al. ........... 359/353 |
| 6,384,944 B1 | * | 5/2002 | Takayama et al. .......... 359/152 |

FOREIGN PATENT DOCUMENTS

| JP | 63108317 | 5/1988 |
| JP | 64-39139 | 2/1989 |
| JP | 6-120900 | 4/1994 |
| JP | 9-83436 | 3/1997 |

OTHER PUBLICATIONS

English Language Abstract of JP 6–120900.
English Language Abstract of JP 9–83436.

* cited by examiner

Primary Examiner—Brent A. Swarthout
(74) Attorney, Agent, or Firm—Greenglum & Bernstein, P.L.C.

(57) ABSTRACT

An integral transmitter-receiver optical communication apparatus, including: a transmitter-receiver device including: a transmitter having a laser source for emitting a laser beam modulated in accordance with a transmission information signal, a receiver having a position detecting sensor and a light receiving element each of which receives a complementing modulated laser beam transmitted from a complementing transmitter, and a beam splitting device for splitting the modulated laser beam and the complementing modulated laser beam into two separate laser beams; a telescopic optical system for transmitting the modulated laser beam emitted by the laser source, and for receiving the complementing modulated laser beam transmitted from the complementing transmitter, the telescopic optical system including a first afocal optical system; a light beam deflecting device positioned between the telescopic optical system and the transmitter-receiver device, wherein the light beam deflecting device is controlled in accordance with a signal output from the position detecting sensor; and a second afocal optical system positioned between the light deflecting device and the transmitter-receiver device.

6 Claims, 23 Drawing Sheets

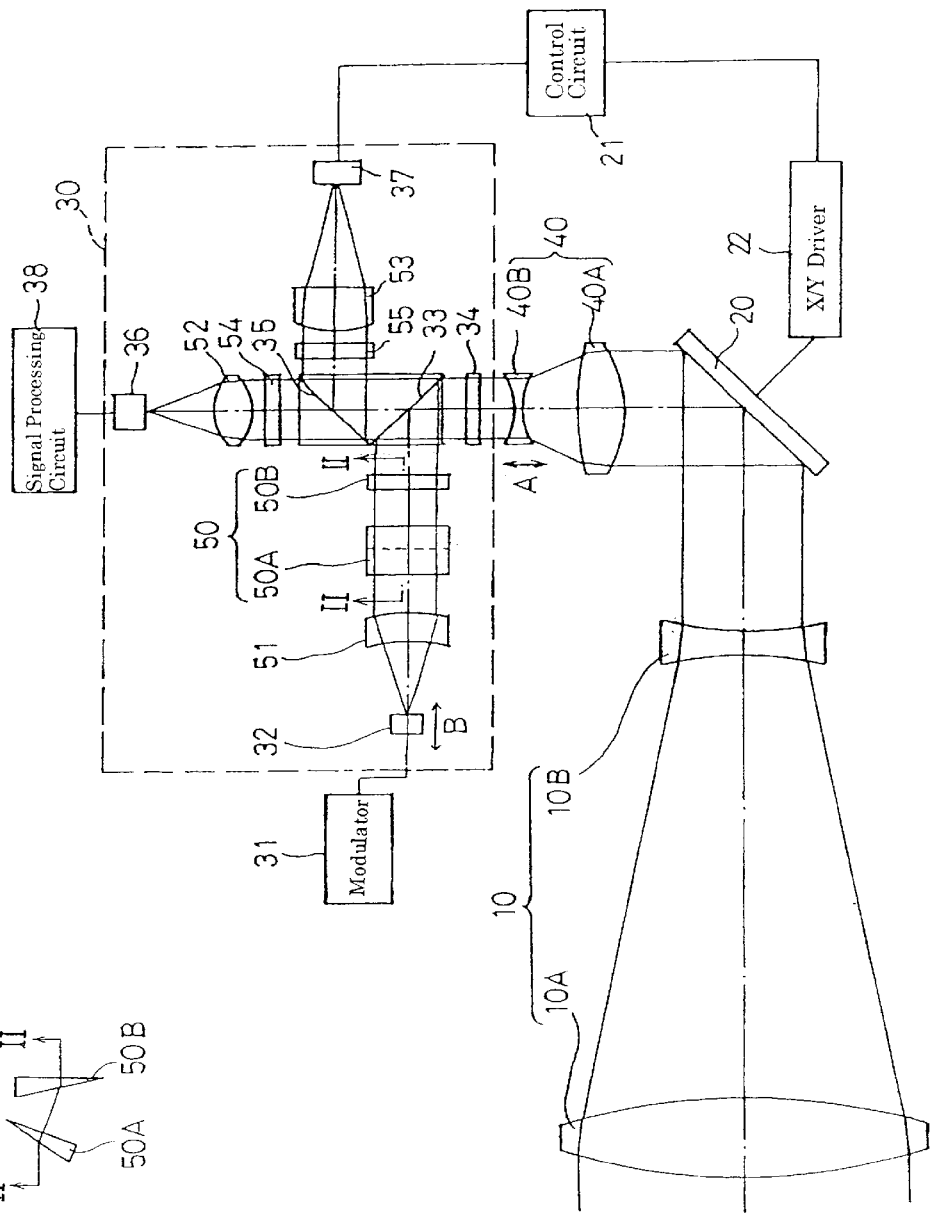
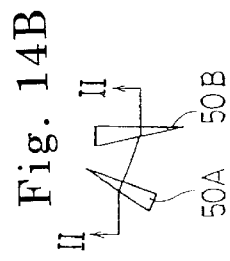
Fig. 14A
Fig. 14B

Prior Art

INTEGRAL TRANSMITTER-RECEIVER OPTICAL COMMUNICATION APPARATUS AND A CROSSTALK PREVENTIVE DEVICE THEREFOR

BACKGROUND OF THE INVENTION

1. Field of the Invention

The present invention relates to an optical communication apparatus, and more specifically to an integral transmitter-receiver optical communication apparatus which is commonly used for both transmitting and receiving signals in the form of a laser beam modulated in accordance with an information signal, and further relates to a crosstalk preventive device for such an optical communication apparatus.

2. Description of the Related Art

FIG. 24 shows an integral transmitter-receiver optical communication apparatus as an example to which the present invention is applicable. This optical communication apparatus includes a telescopic optical system 10, a deflection mirror 20 and a transmitter-receiver unit 30. The telescopic optical system 10 is used for both projecting and receiving a laser beam modulated by an information signal. In this illustrated example, the telescopic optical system 10 is constructed as a reflecting telescope. The deflection mirror 20 is positioned between the telescopic optical system 10 and the transmitter-receiver unit 30 to adjust the direction of the receiving light which enters the transmitter-receiver unit 30 through the telescopic optical system 10 and also the direction of the transmitting light which is emitted from the transmitter-receiver unit 30 to the telescopic optical system 10.

The transmitter-receiver unit 30 is provided with a semiconductor laser source 32 which emits a laser beam modulated by the modulator 31 in accordance with the transmission information signal. The semiconductor laser source 32 is constructed to emit the modulated laser beam so that S-polarized light thereof is reflected. The transmitter-receiver unit 30 is further provided with a polarization beam splitter (PBS) 33 on which the linearly polarized light emitted from the semiconductor laser source 32 is incident. The polarization beam splitter 33 reflects S-polarized light while allowing P-polarized light to pass therethrough. The S-polarized light that is reflected by the polarization beam splitter 33 is incident on the deflection mirror 20 via a λ/4 retardation plate 34. The transmitter-receiver unit 30 is further provided, on a transmission light path of the polarization beam splitter 33, with a beam splitter 35 in order to receive the light signal transmitted from a complementing optical transmitter, which is positioned opposite to the optical communication apparatus. A light receiving element 36 and a position detecting sensor 37, each of which receives a modulated laser beam, are respectively positioned on two separate light paths split by the beam splitter 35. Accordingly, the light emitted by the aforementioned complementing optical transmitter to be received by the telescopic optical system 10 is turned into P-polarized light through the λ/4 retardation plate 34. Subsequently, the P-polarized light passes through the polarization beam splitter 33 and then enters the beam splitter 35 to be split into two separate light beams so that the two separate light beams are incident on the light receiving element 36 and the position detecting sensor 37, respectively. A signal processing circuit 38 is connected to the light receiving element 36 to read out the information conveyed by the light received by the light receiving element 36.

The integral transmitter-receiver optical communication apparatus having the aforementioned structure is generally positioned opposite to the semiconductor laser beam of a complementing optical communication apparatus having an identical structure, wherein the transmission range of the laser beam emitted by the semiconductor laser beam 32 overlaps the transmission range of the semiconductor laser beam emitted by the complementing optical communication apparatus, so that the laser beam modulated by the modulator 31 can be received by the light receiving element 36 in each of the mutually complementing optical communication apparatuses.

In each of the mutually complementing communication apparatuses, the deflection mirror 20 maintains the parallelism of the transmitting laser beam which is incident thereon to be deflected outwards through the telescopic optical system 10, and also the parallelism of the receiving laser beam which is emitted by the complementing optical communication apparatus to be incident on the deflection mirror 20. The deflection mirror 20 can include a rotatable deflection mirror which can be driven about two axes (X and Y axes) which are orthogonal to each other. A rotational portion of the rotatable deflection mirror is coupled to an electromagnetic driver which includes coils and permanent magnets. This electromagnetic driver is driven in accordance with signals output from the position detecting sensor 37. The position detecting sensor 37 detects the variation in the position of the receiving light which enters the transmitter-receiver unit 30 to output a drive command signal to the electromagnetic driver through a control circuit 21 and an X/Y driver 22 to rotate the deflection mirror 20 about the X-axis and the Y-axis thereof, so that the receiving light enters the transmitter-receiver unit at an appropriate position. The position of the deflection mirror 20 continues to be detected by the position detecting sensor 37 in a feed-back operation so that the parallelism of both the light transmitted by the transmitter and the light received by the receiver are maintained.

It is preferable in this type of integral transmitter-receiver optical communication apparatus that the magnification of the telescopic optical system (afocal optical system) 10 be small in order to prevent the image quality from deteriorating due to off-axis incident rays. However, it is preferable that the magnification of the telescopic optical system (afocal optical system) 10 be large in order to miniaturize the drive system for the deflection mirror 20 while miniaturizing the deflection mirror 20 and the following optical system after the deflection mirror 20. Furthermore, it is preferable that the intensity distribution of the transmission light be as close to a circular shape in cross section as closely as possible. It is also preferable that the diameter of the circular cross section (beam diameter) be adjustable.

Upon installation of the integral transmitter-receiver optical communication apparatus, a complementing apparatus which is identical thereto is also installed, so that these mutually complementing apparatuses are fixed at a predetermined distance apart from each other (e.g., one kilometer), and subsequently the direction of light transmitted by one of the mutually complementing apparatuses to the other must be finely adjusted, wherein the optical communication apparatus transmits signals (modulated laser beam) towards the complementing optical communication apparatus which receives the transmitted signals. In such an adjusting operation, not only is the beam diameter of the transmitting laser beam preferably adjustable, but also the peripheral edge of a cross section of the transmitting laser beam is preferably sharp.

In the conceptual structure of the integral transmitter-receiver optical communication apparatus shown in FIG. 24, crosstalk does not occur, in theory, between the transmitting laser beam emitted from the semiconductor laser source 32 and the received laser beam incident upon the light receiving element 36 and the position detecting sensor 37. However, in practice, there is a possibility of such crosstalk occurring due to the polarization beam splitter 33 not being able to perfectly polarize the incident light (in fact, it is practically impossible to provide a polarization beam splitter having a polarization beam splitting thin layer therein through which the incident light is perfectly polarized, and hence, the occurrence of a small percentage of infiltrating (stray) light cannot be prevented), and/or due to the polarization beam splitter 33 and the beam splitter 35 being positioned very closely to each other.

SUMMARY OF THE INVENTION

The first object of the present invention is to provide an integral transmitter-receiver optical communication apparatus having superior cost-performance without requiring excessive high quality, wherein the light deflecting optical system and the following optical systems provided after the light deflecting optical system can be miniaturized without deteriorating the image quality.

The second object of the present invention is to provide an integral transmitter-receiver optical communication apparatus in which the peripheral edge of a cross section of the transmitting laser beam can be made sharp.

The third object of the present invention is to provide an integral transmitter-receiver optical communication apparatus, wherein the occurrence of crosstalk between the transmitting light and the receiving light can be prevented in the case where a polarization beam splitting plane and a beam splitting plane are positioned adjacent to each other.

Other objects of the present invention will become apparent from the detailed description to follow taken in conjunction with the appended claims.

To achieve the object mentioned above, according to the present invention, there is provided an integral transmitter-receiver optical communication apparatus, including: a transmitter-receiver device including: a transmitter having a laser source for emitting a laser beam modulated in accordance with a transmission information signal, a receiver having a position detecting sensor and a light receiving element each of which receives a complementing modulated laser beam transmitted from a complementing transmitter, and a beam splitting device for splitting the modulated laser beam and the complementing modulated laser beam, which are incident thereon, into two separate laser beams; a telescopic optical system for transmitting the modulated laser beam emitted by the laser source, and for receiving the complementing modulated laser beam transmitted from the complementing transmitter, the telescopic optical system including a first afocal optical system; a light beam deflecting device positioned between the telescopic optical system and the transmitter-receiver device, wherein the light beam deflecting device is controlled in accordance with a signal output from the position detecting sensor, and the light beam deflecting device includes a deflection mirror; and a second afocal optical system positioned between the deflection mirror and the transmitter-receiver device. The first afocal optical system can decrease the beam diameter of a laser beam when the first afocal optical system is moved in a direction from the object side to the deflection mirror, and the second afocal optical system can decrease the beam diameter of a laser beam when the second afocal optical system is moved in a direction from the deflection mirror to the transmitter-receiver device. The following condition is also satisfied: $m<2(\theta 3/\theta 1)$; wherein "m" represents the magnification of the first afocal optical system, "$\theta 1$" represents the maximum off-axis incident angle of an incident ray on the first afocal optical system, and "$\theta 3$" represents the maximum angle of rotation of the deflection mirror.

Preferably, the magnification of the second afocal optical system is equal to, or less than, half of the magnification of the first afocal optical system.

The deflection mirror can include a single deflection mirror which can be driven about two axes which are orthogonal to each other.

Alternatively, the deflection mirror can include two deflection mirrors which are driven about two orthogonal axes, respectively.

Preferably, the magnification of the second afocal optical system is less than the magnification of the first afocal optical system.

Preferably, the beam splitting device includes a polarization beam splitting plane and a beam splitting plane.

According to another aspect of the present invention, there is provided an integral transmitter-receiver optical communication apparatus, including: a transmitter-receiver device including: a transmitter having a laser source for emitting a laser beam modulated by transmission information signal, a receiver having a position detecting sensor and a light receiving element each of which receives a complementing modulated laser beam transmitted from a complementing transmitter, and a beam splitting device for splitting the modulated laser beam and the complementing modulated laser beam, which are incident thereon, into two separate laser beams; a telescopic optical system for transmitting the modulated laser beam emitted by the laser source and for receiving the complementing modulated laser beam transmitted from the complementing transmitter, the telescopic optical system including a first afocal optical system; a light beam deflecting device positioned between the telescopic optical system and the transmitter-receiver device, wherein the light beam deflecting device is controlled in accordance with a signal output from the position detecting sensor; a second afocal optical system positioned between the light beam deflecting device and the transmitter-receiver device; and a shaping optical system, positioned between the laser source and the light beam deflecting device, for forming the laser beam emitted from the laser source into a substantially circular cross section. The first afocal optical system includes a positive lens group and a negative lens group to decrease the beam diameter of a laser beam from the object side to the light beam deflecting device, and the second afocal optical system includes a positive lens group and a negative lens group to decrease the beam diameter of a laser beam from the light beam deflecting device to the transmitter-receiver device. Furthermore, at least one of the positive lens group or the negative lens group of the second afocal optical system is movable along an optical axis thereof.

Preferably, a laser beam traveling between the first afocal optical system and the second afocal optical system is a substantially parallel beam.

Preferably, a substantially parallel beam passes through the beam splitting device.

Preferably, a device for moving the laser source along an optical axis is further included to adjust a ratio of a length in a $\theta$-parallel direction and a length in a $\theta$-perpendicular direction of the intensity distribution of the laser beam emitted from the laser source in accordance with the beam-changing characteristics of the shaping optical system, the laser source moving device being used when the integral transmitter-receiver optical communication apparatus is assembled.

Preferably, the shaping optical system is positioned between the laser source and the second afocal optical system.

Preferably, the shaping optical system includes a collimating lens and an anamorphic optical system.

Preferably, the anamorphic optical system includes at least two prisms.

According to another aspect of the present invention, there is provided, an integral transmitter-receiver optical communication apparatus, including: a transmitter-receiver device including: a transmitter having a laser source for emitting a laser beam modulated by transmission information signal, a receiver having a position detecting sensor and a light receiving element, each of which receives a complementing modulated laser beam transmitted from a complementing transmitter, and a beam splitting device for splitting the modulated laser beam and the complementing modulated laser beam, which are incident thereon, into two separate laser beams; a telescopic optical system for transmitting the modulated laser beam emitted by the laser source, and for receiving the complementing modulated laser beam transmitted from the complementing transmitter, the telescopic optical system including a first afocal optical system; a light beam deflecting device positioned between the telescopic optical system and the transmitter-receiver device, wherein the light beam deflecting device is controlled in accordance with a signal output from the position detecting sensor; and a second afocal optical system positioned between the light beam deflecting device and the transmitter-receiver device. The first afocal optical system can decrease the beam diameter of a laser beam when the first afocal optical system is moved in a direction from the object side to the light beam deflecting device. The second afocal optical system can decrease the beam diameter of a laser beam when the second afocal optical system is moved in a direction from the light beam deflecting device to the transmitter-receiver device. Furthermore, an optical axis of the laser source, an optical axis of the light receiving element and an optical axis of the position detecting sensor in the transmitter-receiver device lie on a first plane, and the first plane is coincident with a second plane including an optical axis of the first afocal optical system and an optical axis of the second afocal optical system.

According to another aspect of the present invention, there is provided an integral transmitter-receiver optical communication apparatus, including: a transmitter-receiver device including: a transmitter having a laser source for emitting a laser beam modulated by transmission information signal and a collimating lens for collimating the laser beam emitted from the laser source, a receiver having a position detecting sensor and a light receiving element, each of which receives a complementing modulated laser beam transmitted from a complementing transmitter, and a beam splitting device for splitting the modulated laser beam and the complementing modulated laser beam, which are incident thereon, into two separate laser beams; a telescopic optical system for transmitting the modulated laser beam emitted by the laser source and for receiving the complementing modulated laser beam transmitted from the complementing transmitter, the telescopic optical system including a first afocal optical system; a light beam deflecting device positioned between the telescopic optical system and the transmitter-receiver device, wherein the light beam deflecting device is controlled in accordance with a signal output from the position detecting sensor; a second afocal optical system positioned between the light beam deflecting device and the transmitter-receiver device; and a shaping optical system for forming a laser beam collimated by the collimating lens into a predetermined shape in cross section. The first afocal optical system can decrease the beam diameter of a laser beam when the first afocal optical system is moved in a direction from the object side to the light beam deflecting device. The second afocal optical system can decrease the beam diameter of a laser beam when the second afocal optical system is moved in a direction from the light beam deflecting device to the transmitter-receiver device. Furthermore, an optical axis of the light receiving element and an optical axis of the position detecting sensor in the transmitter-receiver device lie on a first plane, and a plane including an optical axis of the laser source and an optical axis of the collimating lens on the one side of the second afocal optical system lies on a second plane which extends parallel to the first plane, the shaping optical system being positioned between the first plane and the second plane. A plane including an optical axis of the first afocal optical system and the optical axis of the second afocal optical system is coincident with the first plane.

According to another aspect of the present invention, there is provided an integral transmitter-receiver optical communication apparatus, including: a transmitter-receiver device including: a transmitter having a laser source for emitting a laser beam modulated by transmission information signal, a receiver having a position detecting sensor and a light receiving element, each of which receives a complementing modulated laser beam transmitted from a complementing transmitter, and a beam splitting device for splitting the modulated laser beam and the complementing modulated laser beam, which are incident thereon, into two separate laser beams; a telescopic optical system for transmitting the modulated laser beam emitted by the laser source, and for receiving the complementing modulated laser beam transmitted from the complementing transmitter, the telescopic optical system including a first afocal optical system; a light beam deflecting device positioned between the telescopic optical system and the transmitter-receiver device. The light beam deflecting device is controlled in accordance with a signal output from the position detecting sensor. A second afocal optical system positioned between the light beam deflecting device and the transmitter-receiver device. The first afocal optical system can decrease the beam diameter of a laser beam when the first afocal optical system is moved in a direction from an object side to the light beam deflecting device. The second afocal optical system can decrease the beam diameter of a laser beam when the second afocal optical system is moved in a direction from the light beam deflecting device to the transmitter-receiver device. Furthermore, an optical axis of the laser source, an optical axis of the light receiving element and an optical axis of the position detecting sensor in the transmitter-receiver device lie on a first plane, and the first plane is perpendicular to a second plane including an optical axis of the first afocal optical system and an optical axis of the second afocal optical system.

According to another aspect of the present invention, there is provided an integral transmitter-receiver optical communication apparatus, including: a transmitter-receiver device including: a transmitter having a laser source for emitting a laser beam modulated by transmission information signal and a collimating lens for collimating the laser beam emitted from the laser source, a receiver having a position detecting sensor and a light receiving element, each of which receives a complementing modulated laser beam transmitted from a complementing transmitter, and a beam splitting device for splitting the modulated laser beam and the complementing modulated laser beam, which are incident thereon, into two separate laser beams; a telescopic optical system for transmitting the modulated laser beam emitted by the laser source and for receiving the complementing modulated laser beam transmitted from the complementing transmitter, the telescopic optical system including a first afocal optical system; a light beam deflecting device positioned between the telescopic optical system and the transmitter-receiver device, wherein the light beam deflecting device is controlled in accordance with a signal output from the position detecting sensor; a second afocal optical system positioned between the light beam deflecting device and the transmitter-receiver device; and a shaping optical system for forming a laser beam collimated by the collimating lens into a predetermined shape in cross section. The first afocal optical system can decrease the beam diameter of a laser beam when the first afocal optical system is moved in a direction from an object side to the light beam deflecting device. The second afocal optical system can decrease the beam diameter of a laser beam when the second afocal optical system is moved in a direction from the light beam deflecting device to the transmitter-receiver device. Furthermore, an optical axis of the light receiving element and an optical axis of the position detecting sensor in the transmitter-receiver device, lie on a first plane. A plane including an optical axis of the laser source and an optical axis of the collimating lens lies on a second plane which extends parallel to the first plane, the shaping optical system being positioned between the first plane and the second plane, and a plane including an optical axis of the first afocal optical system and the optical axis of the second afocal optical system is perpendicular to the first plane.

Preferably, the beam splitting device includes: a central prism; a first auxiliary prism fixed to the central prism by an adhesive; a second auxiliary prism fixed to the central prism by an adhesive; a polarization beam splitting plane, formed on one of two adhesive surfaces between the central prism and one of the first and second auxiliary prisms, for reflecting the modulated laser beam emitted from the laser source towards the light beam deflecting device, wherein the complementing modulated laser beam transmitted from the complementing transmitter can pass through the polarization beam splitting plane; and a beam splitting plane, formed on another of the two adhesive surfaces between the central prism and another of the first and second auxiliary prisms, for splitting the complementing modulated laser beam which has passed through the polarization beam splitting plane into two separate laser beams to be respectively received by the position detecting sensor and the light receiving element.

Preferably, the central prism includes an incomplete right-angled prism having two adhesive surfaces on which the polarization beam splitting plane and the beam splitting plane are respectively provided, the two adhesive surfaces being angled relative to each other by a right angle; wherein the first auxiliary prism is a right-angled prism including: a first adhesive surface adhered to one of the two adhesive surfaces of the central prism on which the polarization beam splitting plane is provided; and a first light incident/exit surface which is angled relative to the first adhesive surface by 45 degrees; wherein the second auxiliary prism is a right-angled prism including: a second adhesive surface adhered to the other of the two adhesive surfaces of the central prism on which the beam splitting plane is provided; and a second light incident/exit surface which is angled relative to the second adhesive surface by 45 degrees.

According to another aspect of the present invention, there is provided an integral transmitter-receiver optical communication apparatus, including: a transmitter-receiver device including: a transmitter having a laser source for emitting a laser beam modulated by transmission information signal, a receiver having a position detecting sensor and a light receiving element, each of which receives a complementing modulated laser beam transmitted from a complementing transmitter, and a beam splitting device for splitting the modulated laser beam and the complementing modulated laser beam, which are incident thereon, into two separate laser beams; a telescopic optical system for transmitting the modulated laser beam emitted by the laser source and for receiving the complementing modulated laser beam transmitted from the complementing transmitter; a light beam deflecting device positioned between the telescopic optical system and the transmitter-receiver device, wherein the light beam deflecting device is controlled in accordance with a signal output from the position detecting sensor; a collimating lens for collimating the laser beam emitted from the laser source to send the collimated laser beam to the beam splitting device; and a light interceptive member, fixed to the collimating lens, whereby a numerical aperture of the collimating lens smaller than a nominal minimum numerical aperture of the laser source.

Preferably, the light interceptive member is formed so that the numerical aperture of the collimating lens is approximately 80 to 90 percent of the numerical aperture of the laser source.

Preferably, the light interceptive member is integrally formed with a lens holder for holding the collimating lens.

According to another aspect of the present invention, there is provided an integral transmitter-receiver optical communication apparatus, including: a transmitter-receiver device including: a transmitter having a laser source for emitting a laser beam modulated by transmission information signal, a receiver having a position detecting sensor and a light receiving element, each of which receives a complementing modulated laser beam transmitted from a complementing transmitter, and a beam splitting device for splitting the modulated laser beam and the complementing modulated laser beam, which are incident thereon, into two separate laser beams; a telescopic optical system for transmitting the modulated laser beam emitted by the laser source and for receiving the complementing modulated laser beam transmitted from the complementing transmitter; a light beam deflecting device positioned between the telescopic optical system and the transmitter-receiver device, wherein the light beam deflecting device is controlled in accordance with a signal output from the position detecting sensor; a collimating lens for collimating the laser beam emitted from the laser source to send the collimated laser beam to the beam splitting device; and a light interceptive member, fixed to the collimating lens, for cutting off a peripheral part of the collimated laser beam emitted from the collimating lens.

Preferably, the light interceptive member reduces the quantity of light of the collimated laser beam by approximately 10 to 20 percent.

Preferably, the light interceptive member is formed integral with a lens holder for holding the collimating lens.

According to another aspect of the present invention, there is provided a crosstalk preventive device for an integral transmitter-receiver optical communication apparatus, including: a transmitter-receiver device including: a transmitter having a laser source for emitting a laser beam modulated by transmission information signal, a receiver having a position detecting sensor and a light receiving element, each of which receives a complementing modulated laser beam transmitted from a complementing transmitter, and a beam splitting device for splitting the modulated laser beam and the complementing modulated laser beam, which are incident thereon, into two separate laser beams; a telescopic optical system for transmitting the modulated laser beam emitted by the laser source and for receiving the complementing modulated laser beam transmitted from the complementing transmitter; and a light beam deflecting device positioned between the telescopic optical system and the transmitter-receiver device, wherein the light beam deflecting device is controlled in accordance with a signal output from the position detecting sensor. The beam splitting device includes: a central prism; a first auxiliary prism fixed to the central prism by an adhesive; a second auxiliary prism fixed to the central prism by an adhesive; a polarization beam splitting plane, formed on one of two adhesive surfaces between the central prism and one of the first and second auxiliary prisms, for reflecting the modulated laser beam emitted from the laser source towards the light beam deflecting device, wherein the complementing modulated laser beam transmitted from the complementing transmitter can pass through the polarization beam splitting plane; a beam splitting plane, formed on another of the two adhesive surfaces between the central prism and another of the first and second auxiliary prisms, for splitting the complementing modulated laser beam which has passed through the polarization beam splitting plane into two separate laser beams to be respectively received by the position detecting sensor and the light receiving element; and a flat surface, formed on the central prism provided between the polarization beam splitting plane and the beam splitting plane extending parallel to a direction of incidence of the complementing modulated laser beam on the beam splitting device, for making the polarization beam splitting plane and the beam splitting plane apart from each other in the direction of incidence.

Preferably, a casing is further provided for accommodating at least the central prism and first and second auxiliary prisms; wherein the casing includes an opening in order for stray light, emitted from the laser source to pass through the polarization beam splitting plane, to exit the casing therethrough.

Preferably, a casing is further provided for accommodating at least the central prism and first and second auxiliary prisms; wherein the casing includes a light interceptive wall, positioned around a border between the polarization beam splitting plane and the beam splitting plane, for preventing stray light from entering one side of the border where the beam splitting plane is positioned from another side of the border where the laser source is positioned.

Preferably, the central prism includes an incomplete right-angled prism having two adhesive surfaces on which the polarization beam splitting plane and the beam splitting plane are respectively positioned, the two adhesive surfaces being angled relative to each other by a right angle, the flat surface of the central prism being angled relative to each of the polarization beam splitting plane and the beam splitting plane by 45 degrees; wherein the first auxiliary prism is a right-angled prism including: a first adhesive surface adhered to one of the two adhesive surfaces of the central prism on which the polarization beam splitting plane is provided; and a first light incident/exit surface which is angled relative to the first adhesive surface by 45 degrees; and the second auxiliary prism is a right-angled prism including: a second adhesive surface adhered to the other of the two adhesive surfaces of the central prism on which the beam splitting plane is positioned; and a second light incident/exit surface which is angled relative to the second adhesive surface by 45 degrees.

According to another aspect of the present invention, there is provided a crosstalk preventive device for an integral transmitter-receiver optical communication apparatus, including: a transmitter-receiver device including: a transmitter having a laser source for emitting a laser beam modulated by transmission information signal, a receiver having a position detecting sensor and a light receiving element, each of which receives a complementing modulated laser beam transmitted from a complementing transmitter, and a beam splitting device for splitting the modulated laser beam and the complementing modulated laser beam, which are incident thereon, into two separate laser beams; a telescopic optical system for transmitting the modulated laser beam emitted by the laser source, and for receiving the complementing modulated laser beam transmitted from the complementing transmitter; and a light beam deflecting device positioned between the telescopic optical system and the transmitter-receiver device, wherein the light beam deflecting device is controlled in accordance with a signal output from the position detecting sensor. The beam splitting device includes: a central prism; a first auxiliary prism fixed to the central prism by an adhesive; a second auxiliary prism fixed to the central prism by an adhesive; a polarization beam splitting plane, formed on one of two adhesive surfaces between the central prism and one of the first and second auxiliary prisms, for reflecting the modulated laser beam emitted from the laser source towards the light beam deflecting device, wherein the complementing modulated laser beam transmitted from the complementing transmitter can pass through the polarization beam splitting plane; and a beam splitting plane, formed on another of the two adhesive surfaces between the central prism and another of the first and second auxiliary prisms, for splitting the complementing modulated laser beam which has passed through the polarization beam splitting plane into two separate laser beams to be respectively received by the position detecting sensor and the light receiving element. Each of light incident/exit surfaces of the central prism and the first and second auxiliary prisms is formed so as not to be parallel to a plane which is angled relative to each of the polarization beam splitting plane and the beam splitting plane by 45 degrees so that reflected light at any of the light incident/exit surfaces of the central prism and the first and second auxiliary prisms cannot enter either the light receiving element or the position detecting sensor.

Preferably, the light incident/exit surfaces of the central prism and the first and second auxiliary prisms are each angled so that an incident laser beam on either the first auxiliary prism or the second auxiliary prism extends parallel or perpendicular to a corresponding emergent laser beam from the central prism, the first auxiliary prism, or the second auxiliary prism.

Preferably, one of the first and second auxiliary prisms, on which the polarization beam splitting plane is provided, includes a first prism which has an isosceles-triangle cross-section having a vertex angle $\alpha$ of less than 90 degrees; and the other of the first and second auxiliary prism, on which the beam splitting plane is provided, includes a second prism which has an isosceles-triangle cross-section having a vertex angle $\beta$ of more than 90 degrees.

Preferably, the sum of the vertex angle α and the vertex angle β is 180 degrees.

Preferably, a light exit surface of the central prism, through which a laser beam that is reflected by the beam splitting plane to emerge from the central prism, extends parallel to a surface of at lease one of the first prism and the second prism.

According to another aspect of the present invention, there is provided a crosstalk preventive device for an integral transmitter-receiver optical communication apparatus, including: a transmitter-receiver device including: a transmitter having a laser source for emitting a laser beam modulated by transmission information signal, a receiver having a position detecting sensor and a light receiving element, each of which receives a complementing modulated laser beam transmitted from a complementing transmitter, and a beam splitting device for splitting the modulated laser beam and the complementing modulated laser beam, which are incident thereon, into two separate laser beams; a telescopic optical system for transmitting the modulated laser beam emitted by the laser source and for receiving the complementing modulated laser beam transmitted from the complementing transmitter; and a light beam deflecting device positioned between the telescopic optical system and the transmitter-receiver device, wherein the light beam deflecting device is controlled in accordance with a signal output from the position detecting sensor. The beam splitting device includes: a polarizing plate for reflecting the modulated laser beam emitted from the laser source towards the light beam deflecting device, and allowing the complementing modulated laser beam transmitted from the complementing transmitter to pass through the polarizing plate; and a beam splitting plate for splitting the complementing modulated laser beam which has passed through the polarization beam splitting plane into two separate laser beams to be respectively received by the position detecting sensor and the light receiving element.

The present disclosure relates to subject matter contained in Japanese Patent Applications:

No. 10-203765 (filed on Jul. 17, 1998),
No. 10-204549 (filed on Jul. 21, 1998),
No. 10-204550 (filed on Jul. 21, 1998),
No. 10-204552 (filed on Jul. 21, 1998),
No. 10-204553 (filed on Jul. 21, 1998),
No. 10-333828 (filed on Nov. 25, 1998),
No. 10-335826 (filed on Nov. 26, 1998),
No. 11-81312 (filed on Mar. 25, 1999),
No. 11-81344 (filed on Mar. 25, 1999),
No. 11-81446 (filed on Mar. 25, 1999), and
No. 11-81479 (filed on Mar. 25, 1999), which are expressly incorporated herein by reference in their entireties.

BRIEF DESCRIPTION OF THE DRAWINGS

The invention will be discussed below in detail, with reference to the accompanying drawings, in which:

FIG. 14A is a vertical sectional view of the first embodiment of the integral transmitter-receiver optical communication apparatus according to the third aspect of the present invention;

FIG. 14B is a cross sectional view taken along II—II line shown in FIG. 14A, looking in the direction of the appended arrows;

DESCRIPTION OF THE PREFERRED EMBODIMENTS

Figure 1A:
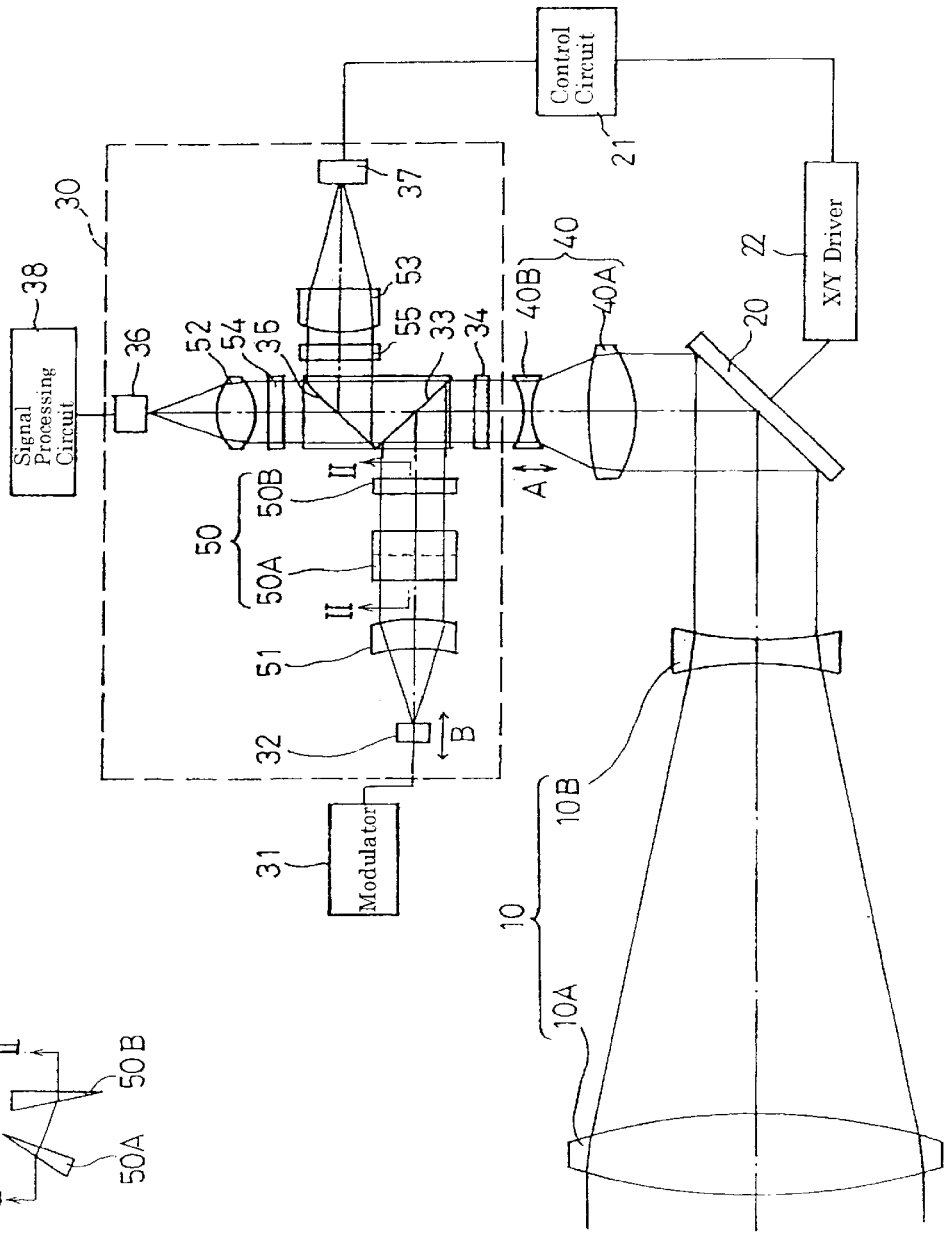
FIG. 1A is a systematic illustration showing the first embodiment of an integral transmitter-receiver optical communication apparatus according to the first aspect of the present invention.
Figure 1B:
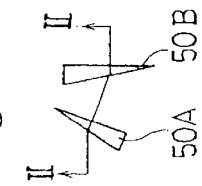
FIG. 1B is a cross sectional view, taken along II—II line shown in FIG. 1A, looking in the direction of the appended arrows.
Figure 24:
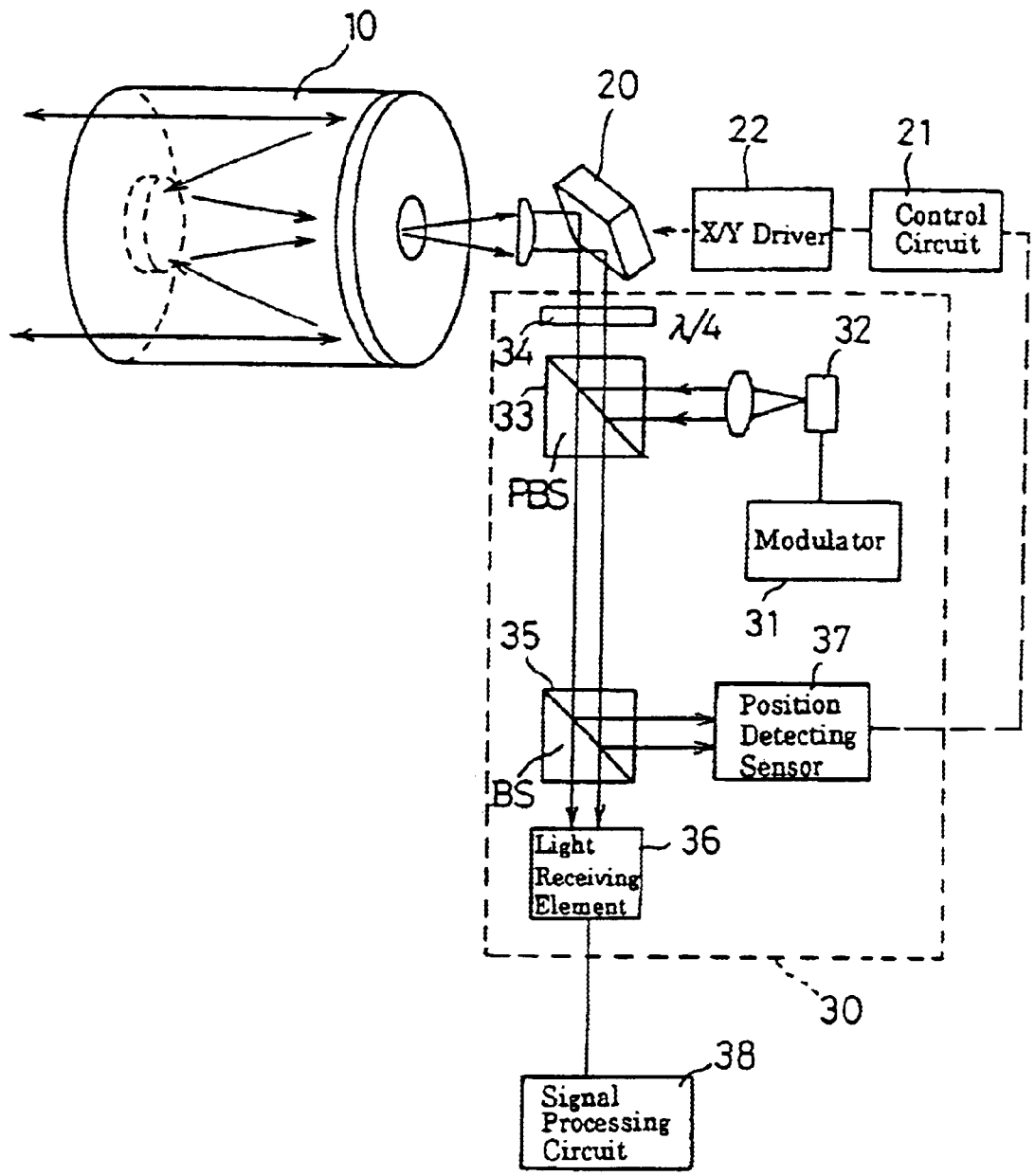
FIG. 24 is a schematic illustration showing a conventional integral transmitter-receiver optical communication apparatus.

FIGS. 1A and 1B show the first embodiment of an integral transmitter-receiver optical communication apparatus, according to the first aspect of the present invention. In FIG. 1A, members or elements similar to those shown in FIG. 24 are designated by the same reference designators. The telescopic optical system 10 is an afocal optical system (first afocal optical system) including a first lens group 10A having a positive power and a second lens group 10B having a negative power, in this order from the object side. The afocal optical system is an optical system of zero convergent power, the focal points thereof being infinitely distant, so that the light beam which emerges from the second afocal optical system 40 remains as a substantially parallel beam if the light beam which enters the second afocal optical system 40 is a substantially parallel beam. However, the beam diameter of the light beam incident on the first afocal optical system is decreased therethrough in the direction from the object side to the deflection mirror 20 which functions as a light beam deflecting device. The reduction ratio of the diameter (magnification) of the telescopic optical system (i.e., the first afocal optical system) 10 can be set to a ratio of approximately one to four (four times).

There is provided a second afocal optical system 40 between a deflection mirror (light beam deflecting device) 20 and a transmitter-receiver unit 30. The second afocal optical system 40 is provided with a first lens group 40A having a positive power and a second lens group 40B having a negative power, in this order from the side of the deflection mirror 20 to the side of the transmitter-receiver unit 30. Similar to the telescopic optical system (first afocal optical system) 10, the second afocal optical system 40 is an optical system of zero convergent power, the focal points thereof being infinitely distant, so that the light beam which emerges from the second afocal optical system is a substantially parallel beam if the light beam which enters the second afocal optical system is a substantially parallel beam. However, the beam diameter of the light beam incident on the second afocal optical system is decreased therethrough in the direction from the side of the deflection mirror 20 to the side of the transmitter-receiver unit 30. The reduction ratio of the diameter (magnification) of the second afocal optical system 40 can be set to a ratio of approximately one to two (two times).

The second lens group 40B having a negative power is guided along an optical axis thereof (i.e., along the direction of an arrow A shown in FIG. 1A) so that the axial position of the second lens group 40B can be adjusted. Moving the second lens group 40B along the optical axis thereof causes the beam diameter (angle of divergence) of the laser beam which emerges from the second afocal optical system 40 to change, thus causing the beam diameter (angle of divergence) of the laser beam which emerges from the telescopic optical system 10 to change. Although such a change in the beam diameter slightly deteriorates the afocal characteristics of the first and second afocal optical systems, the emergent laser beam which emerges from the telescopic optical system 10 can be regarded as a substantially parallel beam. Any type of conventional lens moving device can be used as a device for moving the second lens group 40B. The magnification of the second afocal optical system 40 is smaller than that of the first afocal optical system (the telescopic optical system 10), so that the beam diameter (angle of divergence) of the laser beam which emerges from the telescopic optical system 10 can be finely adjusted by adjusting the beam diameter of the laser beam which emerges from the second afocal-optical system 40. In addition, the mechanical structure of the device for moving the second lens group 40B can be simplified due to the low weight of the second lens group 40B.

The laser beam traveling between the telescopic optical system 10 and the second afocal optical system 40 is a substantially parallel beam. This parallel beam is incident on the deflection mirror (light beam deflecting device) 20. The deflection mirror 20 is driven by the X/Y driver 22 about each of two orthogonal directions (X and Y axes) to adjust the direction of projecting the transmitting light and/or the direction of the receiving light traveling towards the transmitter-receiver unit 30. Since the deflection mirror 20 is disposed at a position where the parallel beam travels, the focal point in the transmitter-receiver unit 30 does not deviate even if the deflection mirror 20 deflects the laser beam incident thereon.

Figure 2:
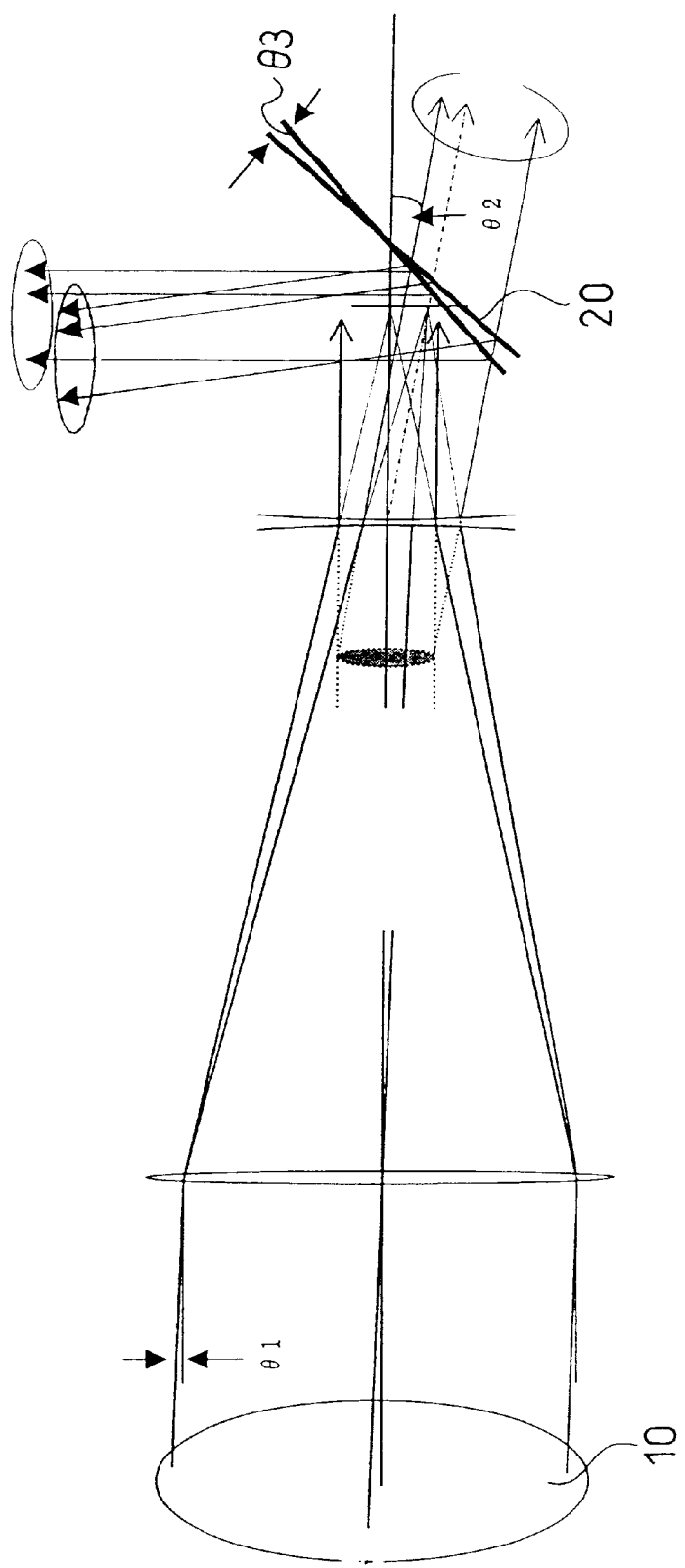
FIG. 2 is an explanatory view showing the relationship between the magnification of the first afocal optical system and the maximum angle of rotation of the deflection mirror.

FIG. 2 shows the relationship between the magnification of the first afocal optical system 10 and the maximum angle of rotation of the deflection mirror 20. In FIG. 2, in accordance with an equation relative to an angular magnification, the following equation is satisfied:

$$\theta 2 = m \times \theta 1$$

wherein
"θ1" represents the maximum off-axis incident angle of an incident ray on the first afocal optical system 10,
"θ2" represents the exit angle of the incident ray at the maximum off-axis incident angle θ1, and
"m" represents the magnification of the first afocal optical system 10.

In order to make the inclination of the laser beam (the exit angle θ2) zero by the angle of rotation θ3 of the deflection mirror 20 (in accordance with a law of reflection for deflection mirrors), the deflection mirror 20 is rotated by an amount which satisfies the following equation:

$$\theta 3 = \theta 2 / 2$$

When such a relationship is satisfied, a necessary composite magnification can be obtained without deteriorating the image quality at a low cost of production if the following condition is also satisfied:

$$m<2(\theta 3/\theta 1)$$

If this condition is satisfied, the first afocal optical system 10 does not need to undertake an excessive magnification burden, so that the first and second afocal optical systems 10 and 40 can proportionally share the necessary composite magnification. For instance, in the case where the maximum angle of rotation of the deflection mirror 20 is set to two degrees (20), the magnification "m" of the first afocal optical system 10 is preferably set to four or less.

In practice, the first afocal optical system 10, the deflection mirror 20 and the second afocal optical system 40 include unintentional manufacturing error, and unintentional assembly error. Such errors give an undesirable influence on the image quality due to the composite magnification of the first and second afocal optical systems 10 and 40 being large. In order to miniaturize the first and second afocal optical systems 10 and 40, it is preferable that the magnification of the second afocal optical system 40 be as large as possible. However, in the case where the magnification of the second afocal optical system 40 is excessively large, compared with the magnification "m" of the first afocal optical system 10, the image quality is deteriorated. Accordingly, if it is desired to miniaturize the transmitter-receiver unit 30 while maintaining the image quality, the magnification of the second afocal optical system is preferably m/2 or less.

Figure 3:
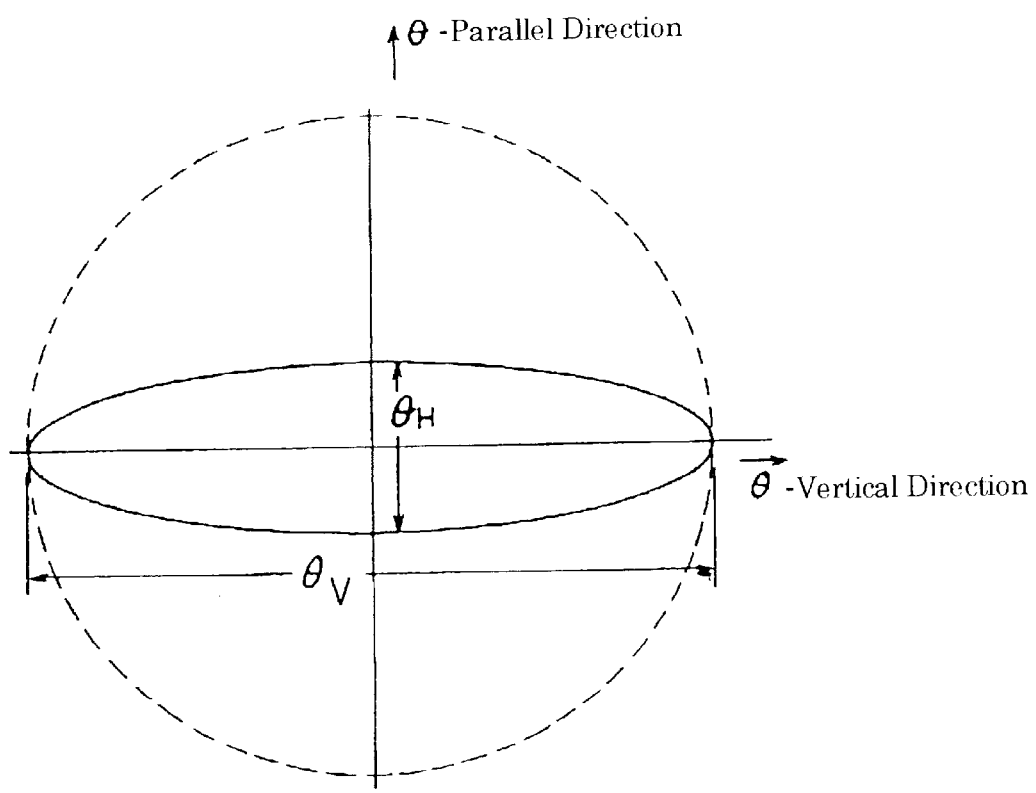
FIG. 3 is an explanatory view showing a cross sectional shape (shown by a solid line) of the laser beam emitted from the semiconductor laser source, and a cross sectional shape (shown by a dotted line) of the deformed laser beam, taken along a plane perpendicular to the optical axis of the laser beam.

A collimating lens 51 and an anamorphic optical system 50 (which constitute a shaping optical system) are disposed between the semiconductor laser source 32 and the polarization beam splitter 33, in that order from the semiconductor laser source 32 toward the polarization beam splitter 33. The laser beam emitted from the semiconductor laser source 32 is collimated by the collimating lens 51 to be incident on the anamorphic optical system 50. The anamorphic optical system 50 includes a first prism 50A and a second prism 50B. The semiconductor laser source 32, provided so that the S-polarized laser beam emitted therefrom is reflected by the polarization beam splitter 33, emits a laser beam having a linear or elliptical shaped cross section. This laser beam is collimated through the collimating lens 51 and subsequently shaped into a circular cross section via the anamorphic optical system 50. As is commonly known, the laser beam emitted from the semiconductor laser source 32 has a linear or elliptical shaped intensity distribution, rather than a circular-shape intensity distribution. FIG. 3 schematically shows such an intensity distribution having an elliptical shape (shown by a solid line). The length θH in the θ-parallel direction (short-axis direction) of the intensity distribution (i.e., a cross section taken along a plane perpendicular to the laser beam emitted from the semiconductor laser source 32) is shorter than the length θV in the θ-perpendicular direction (long-axis direction) of the intensity distribution, wherein the length θH and the length θV extend perpendicularly to each other. The anamorphic optical system 50 changes the elliptical intensity distribution into a circular intensity distribution, as shown by a dotted line in FIG. 3, by expanding the length θH in the θ-parallel direction via the first and second prisms 50A and 50B to make the length θH in the θ-parallel direction substantially identical to the length θV in the θ-perpendicular direction. Note that the length θH in the θ-parallel direction is the direction of vibration of the linear polarization.

The semiconductor laser source 32 is guided in an optical axis direction (in the direction of an arrow "B" shown in FIG. 1A) to be movable relative to the collimating lens 51 so that the axial position of the semiconductor laser source 32 is adjustable. Adjustment of the ratio of the length θH in the θ-parallel direction and the length θO in the θ-perpendicular direction of the intensity distribution of the laser beam emitted from the semiconductor laser source 32 can be carried out by adjusting the axial position of the semiconductor laser source 32 relative to the collimating lens 51 to obtain a laser beam having a circular intensity distribution. The magnification of the anamorphic optical system 50 is constant, but the ratio of the length θH in the θ-parallel direction to the length θV in the θ-perpendicular direction of the intensity distribution of the laser beam emitted from the semiconductor laser source 32 is not always the same. However, the ratio of the length θH in the θ-parallel direction and the length θV in the θ-perpendicular direction can be adjusted during assembly by adjusting the axial position of the semiconductor laser source 32 relative to the collimating lens 51 to obtain the laser beam having a circular intensity distribution. The device for moving the semiconductor laser source 32 can be any conventional lens moving device.

It is known in the art that a polarization beam splitter changes its transmittance and reflectance in accordance with the variation in the angle of incidence of the incident light, so that such a change of the transmittance and reflectance can be prevented from occurring by collimating the laser beam incident on the polarization beam splitter 33. Hence, the θ-polarized light (linearly polarized light) which is reflected by the deflection mirror 20 to be in turn transmitted outwardly via the telescopic optical system 10 is also a parallel laser beam. The λ/4 retardation plate 34 is provided for changing the P-polarized light received from the complementing optical communication apparatus into S-polarized light by rotating the plane of polarization of the incident laser beam by 90 degrees.

On the other hand, the receiving laser beam that passes through the polarization beam splitter 33 and then the beam splitter 35 via the telescopic optical system 10, the deflection mirror 20 and the second afocal optical system 40 is also a parallel beam, so that the aforementioned problem of a polarization beam splitter changing its transmittance and reflectance in accordance with a variation in the angle of incidence of the incident light on the polarization beam splitter is prevented from occurring, similar to the collimated transmitting laser beam incident on the polarization beam splitter 33. The transmitter-receiver unit 30 is provided, in one of the two split light paths between the beam splitter 35 and the light receiving element 36, with a condenser lens 52 and a band-pass filter 54, while the transmitter-receiver unit 30 is provided in the other split light path between the beam splitter 35 and the position detecting sensor 37 with a condenser lens 53 and a band-pass filter 55. The condenser lens 52 focuses the collimated receiving laser beam on the light receiving element 36, while the condenser lens 53 focuses the collimated receiving laser beam on the position detecting sensor 37.

The integral transmitter-receiver optical communication apparatus having the aforementioned structure is utilized in a manner similar to a conventional integral transmitter-receiver optical communication apparatus. Namely, the first embodiment of the optical communication apparatus is utilized by being generally positioned opposite to the semiconductor laser beam of a complementing optical communication apparatus having an identical structure in a manner such that the transmission range of the laser beam emitted by the semiconductor laser source 32 overlaps that emitted by the semiconductor laser beam of the complementing optical communication apparatus, so that the laser beam modulated by the modulator 31 is received by the light receiving element 36 in each of the two mutually complementing optical communication apparatuses. Accordingly, the complementing optical communication apparatus can easily receive the transmitting laser beam emitted from the semiconductor laser source 32 of the present embodiment of the optical communication apparatus because the transmitting laser beam has a circular intensity distribution formed by the anamorphic optical system 50, which gives a wide receiving range to the complementing telescopic optical system of the complementing optical communication apparatus. The beam diameter of the transmitting laser beam emitted from the telescopic optical system 10 can be adjusted by adjusting the position of the second lens group 40B of the second afocal optical system 40. Accordingly, stable optical communication can be carried out by adjusting the beam diameter of the transmitting laser beam of the complementing telescopic optical system of the complementing optical communication apparatus to be slightly greater than the diameter of the receiving range of the complementing telescopic optical system of the complementing optical communication apparatus in accordance with the distance between the two mutually complementing optical communication apparatuses. Further, since two afocal optical systems (the first and second afocal optical systems 10 and 40) are respectively positioned before and after the light beam deflecting device (the deflection mirror 20), the deflection mirror 20 and the following optical systems provided after the deflection mirror 20 can be miniaturized without deteriorating the image quality.

Figure 4:
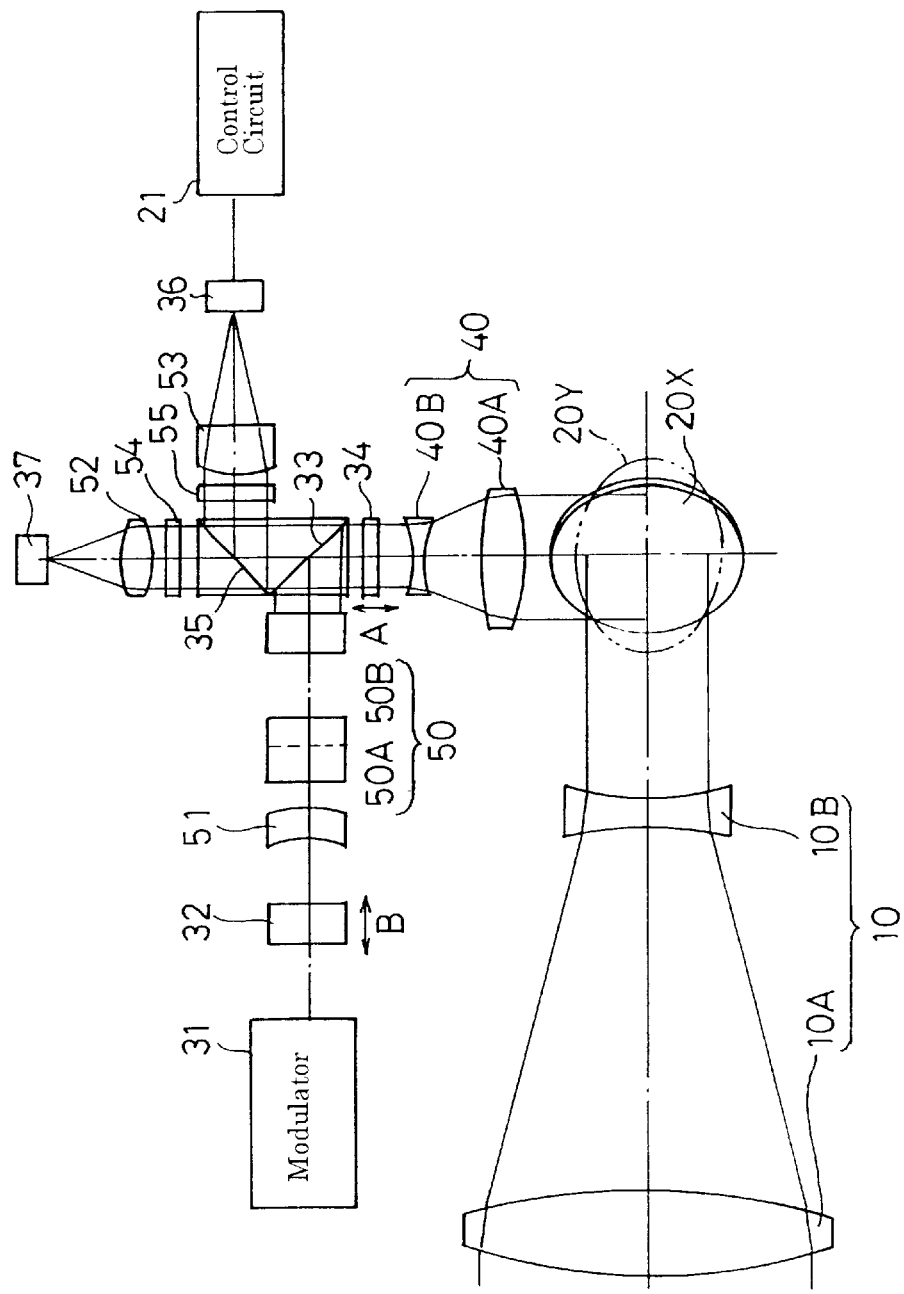
FIG. 4 is a systematic illustration showing the second embodiment of the integral transmitter-receiver optical communication apparatus according to the first aspect of the present invention.
Figure 5:
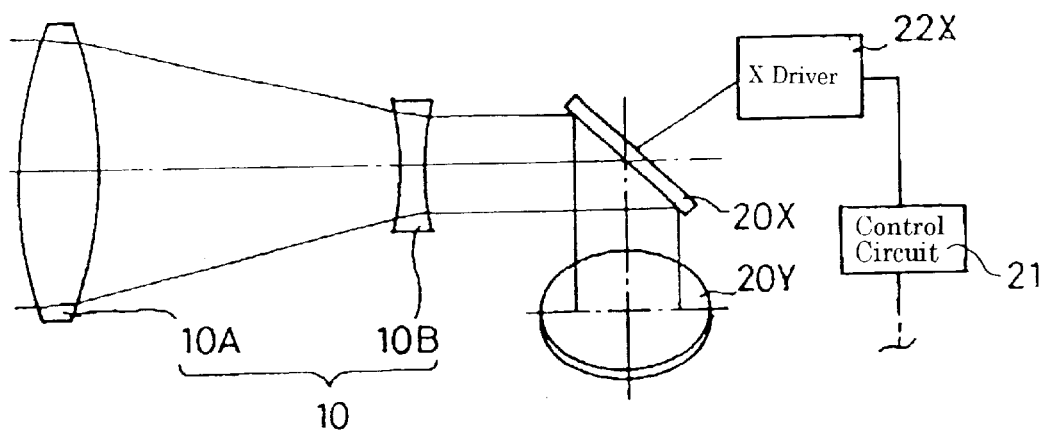
FIG. 5 is a plan view of the optical communication apparatus shown in FIG. 4.
Figure 6:
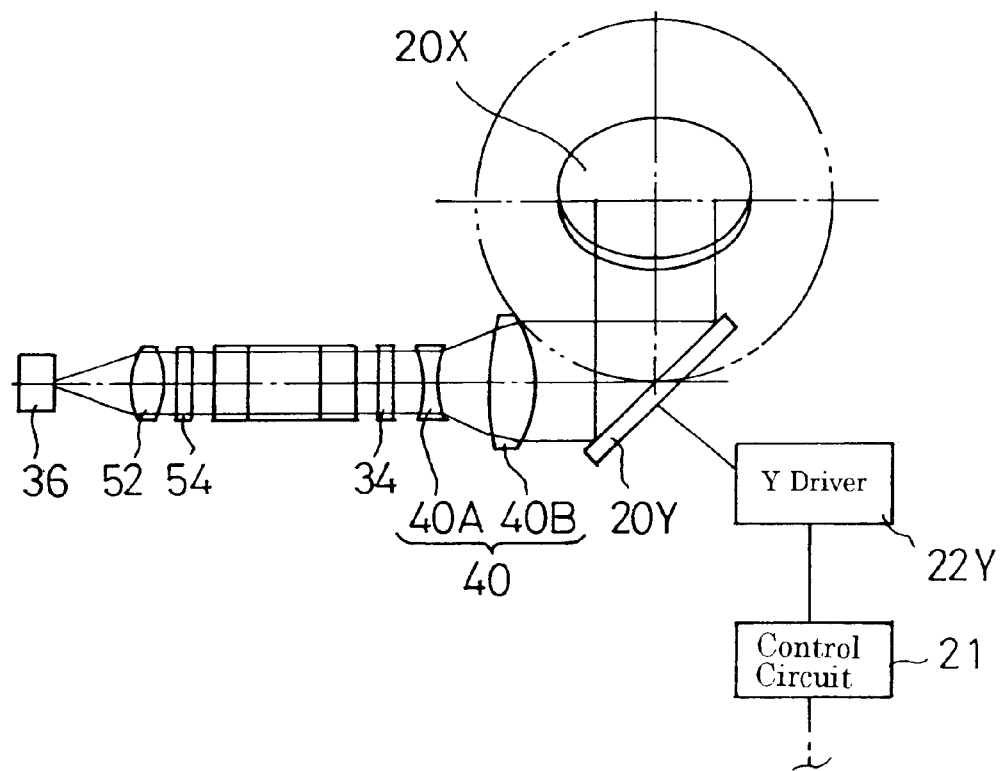
FIG. 6 is a side elevational view of the optical communication apparatus shown in FIG. 4.

FIGS. 4 through 6 show the second embodiment of the integral transmitter-receiver optical communication apparatus, according to the first aspect of the present invention. In the previous first embodiment the light beam deflecting device (deflection mirror 20) is rotated about the X and Y axes (which are orthogonal to each other) by the X/Y axes driver 22; whereas in the second embodiment, the light beam deflecting device includes an X-direction deflection mirror 20X and a Y-direction deflection mirror 20Y which are driven by an X-axis driver 22X and a Y-axis driver 22Y, respectively. Except for this modification, the second embodiment is identical to the first embodiment shown in FIG. 1A. In FIGS. 4 through 6, members or elements similar to those shown in FIG. 1A are designated by the same reference designators.

Figure 7:
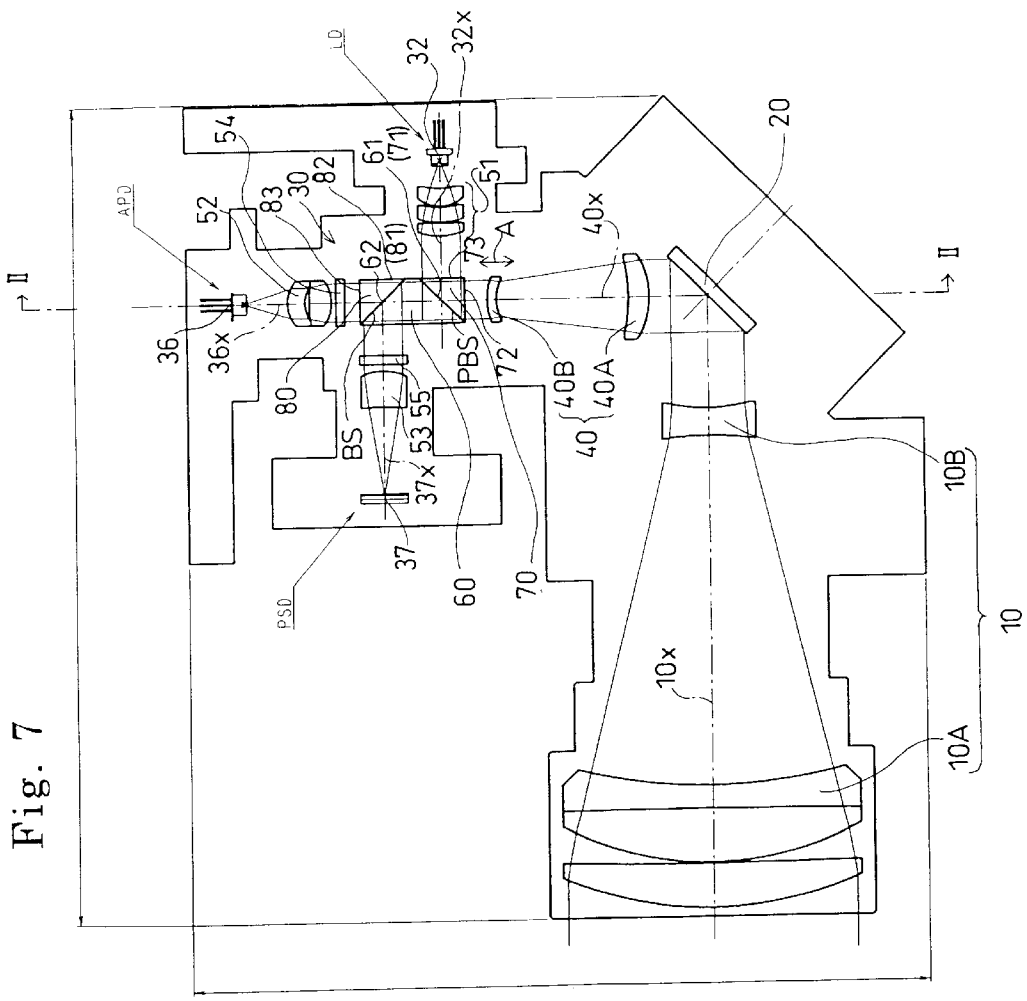
FIG. 7 is a vertical sectional view of the first embodiment of the integral transmitter-receiver optical communication apparatus according to the second aspect of the present invention.

FIG. 7 shows the first embodiment of the integral transmitter-receiver optical communication apparatus according to the second aspect of the present invention. In FIG. 7 members or elements similar to those shown in FIG. 24 are designated by the same reference designators. The telescopic optical system 10 is an afocal optical system (first afocal optical system) including a first lens group 10A having a positive power and a second lens group 10B having a negative power, in this order from the object side. The first afocal optical system is an optical system of zero convergent power, the focal points thereof being infinitely distant, so that the light beam which emerges from the second afocal optical system 40 is a substantially parallel beam if the light beam which enters the second afocal optical system 40 is a substantially parallel beam. The beam diameter of the light beam incident on the first afocal optical system is decreased therethrough in the direction from the object side to the deflection mirror 20 which functions as a light beam deflecting device.

A second afocal optical system 40 is provided between the deflection mirror 20 and the transmitter-receiver unit 30. The second afocal optical system 40 is provided with a first lens group 40A having a positive power and a second lens group 40B having a negative power, in that order from the deflection mirror 20 toward the transmitter-receiver unit 30. Similar to the telescopic optical system 10, the second afocal optical system 40 is an optical system of zero convergent power, the focal points thereof being infinitely distant, so that the light beam which emerges from the second afocal optical system is a substantially parallel beam if the light beam which enters the second afocal optical system is a substantially parallel beam. The beam diameter of the light beam incident on the second afocal optical system is decreased therethrough in the direction from the deflection mirror 20 to the transmitter-receiver unit 30. The second lens group 40B, having a negative power, is guided along an optical axis thereof (i.e., along the direction of an arrow A shown in FIG. 7) so that the axial position of the second lens group 40B can be adjusted. Moving the second lens group 40B along the optical axis thereof causes the beam diameter (angle of divergence) of the laser beam which emerges from the second afocal optical system 40 to change, thus causing the beam diameter (angle of divergence) of the laser beam which emerges from the telescopic optical system 10 to change. Although such a change in the beam diameter slightly deteriorates the afocal characteristics of the first and second afocal optical systems, the emergent laser beam which emerges from the telescopic optical system 10 can be regarded as a substantially parallel beam. The device for moving the second lens group 40B can be a conventional moving device. The magnification of the second afocal optical system 40 is smaller than that of the first afocal optical system (the telescopic optical system 10) so that the beam diameter (angle of divergence) of the laser beam which emerges from the telescopic optical system 10 can be finely adjusted by adjusting the beam diameter of the laser beam which emerges from the second afocal optical system 40. In addition, the mechanical structure of the device for moving the second lens group 40B can be simplified due to the low weight of the second lens group 40B.

The beam diameter of the transmitting laser beam emitted from the telescopic optical system 10 can be adjusted by adjusting the position of the second lens group 40B of the second afocal optical system 40, so that stable optical communication can be carried out by adjusting the beam diameter of the transmitting laser beam at the complementing telescopic optical system of the complementing optical communication apparatus to be slightly greater than the diameter of the receiving range of the complementing telescopic optical system of the complementing optical communication apparatus in accordance with the distance between the two mutually complementing optical communication apparatuses. Further, since two afocal optical systems (the first and second afocal optical systems 10 and 40) are respectively positioned before and after the light beam deflecting device (the deflection mirror 20), the deflection mirror 20 and the following optical systems provided after the deflection mirror 20 can be miniaturized without deteriorating the image quality.

The laser beam traveling between the telescopic optical system 10 and the second afocal optical system 40 is a substantially parallel beam. This parallel beam is incident on the deflection mirror 20. The deflection mirror 20 is driven by the X/Y driver 22 about two orthogonal directions (X and Y axes) to adjust the direction of projecting the transmitting light and/or the direction of the receiving light traveling towards the transmitter-receiver unit 30. Since the deflection mirror 20 is disposed at a position where the parallel beam travels, a focal point in the transmitter-receiver unit 30 does not deviate even if the deflection mirror 20 deflects the laser beam incident thereon.

Figure 8:
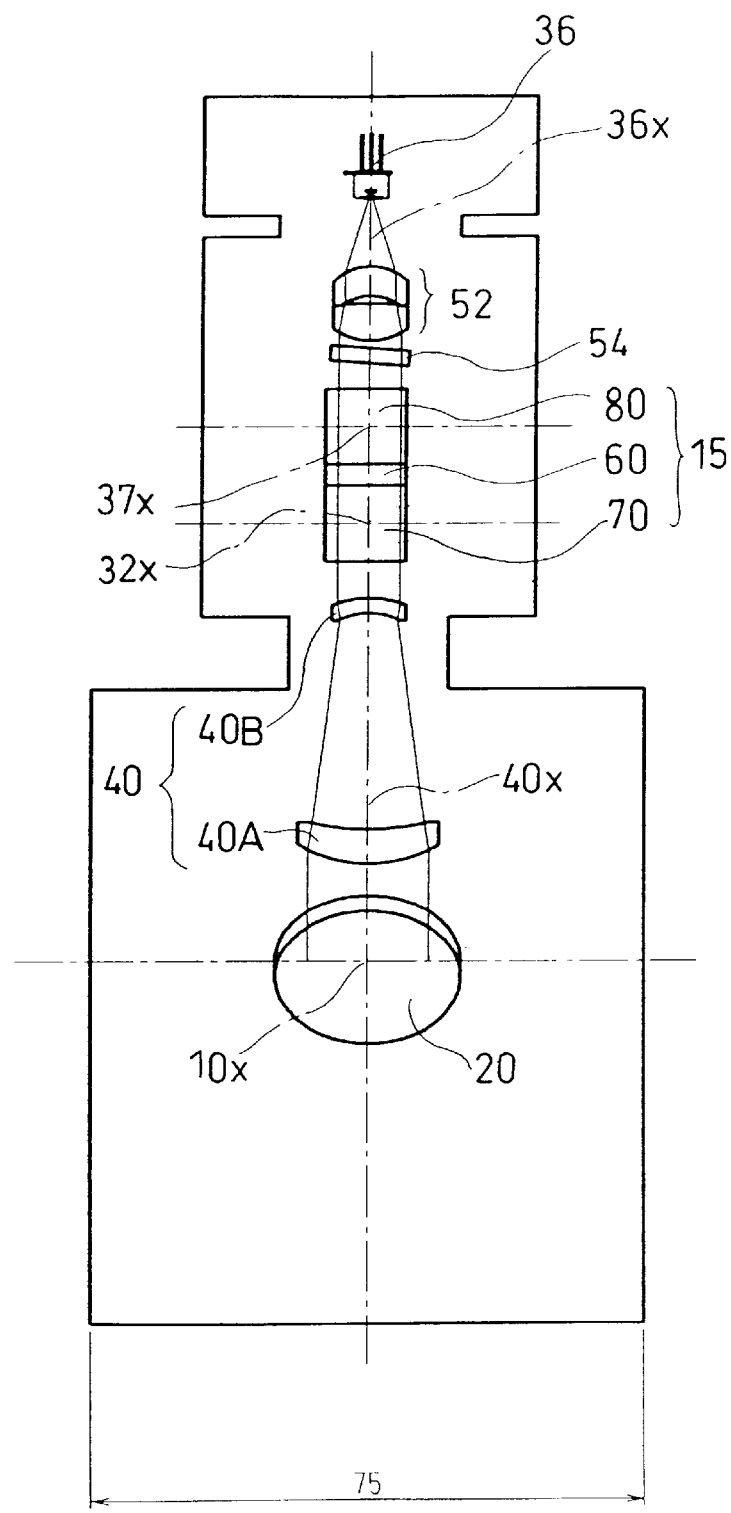
FIG. 8 is a cross sectional view taken along II—II line shown in FIG. 7.

The transmitter-receiver unit 30 is provided with a beam splitting unit (beam splitting device) 15 which includes a central prism 60 and a couple of auxiliary prisms 70 and 80 (see FIG. 8). The central prism 60 and the couple of auxiliary prisms 70 and 80 are a right-angled prisms. The central prism 60 includes two adhesive surfaces 61 and 62 whose surfaces (extended imaginary planes) are angled relative to each other by a right angle (90 degrees). Each of the two adhesive surfaces 61 and 62 is angled relative to an optical axis 40X of the second afocal optical system 40 by 45 degrees. The auxiliary prism 70 includes an adhesive surface 71 which is attached to the adhesive surface 61 by an adhesive. The auxiliary prism 70 further includes incident/exit surfaces 72 and 73 which are angled relative to each other by a right angle, wherein each of the incident/exit surfaces 72 and 73 is angled relative to the adhesive surface 71 by 45 degrees. Likewise, the auxiliary prism 80 includes an adhesive surface 81 which is attached to the adhesive surface 62 by an adhesive. The auxiliary prism 80 further includes incident/exit surfaces 82 and 83 which are angled relative to each other by a right angle, wherein each of the incident/exit surfaces 82 and 83 is angled relative to the adhesive surface 81 by 45 degrees.

A polarization beam splitting thin layer is interposed between the adhesive surface 61 of the central prism 60 and the adhesive surface 71 of the auxiliary prism 70 to form a polarization beam splitting plane PBS therebetween. A beam splitting thin layer is interposed between the adhesive surface 62 of the central prism 60 and the adhesive surface 81 of the auxiliary prism 80 to form a beam splitting plane BS therebetween. The polarization beam splitting plane PBS is angled relative to the optical axis 40X (of the second afocal optical system 40) and the optical axis 32X (of the semiconductor laser source 32) by 45 degrees; whereas the beam splitting plane BS is angled relative to the optical axis 40X (of the second afocal optical system 40) and the optical axis 37X (of the position detecting sensor 37) by 45 degrees. The optical axis 36X of the light receiving element 36 is coincident with the optical axis 40X of the second afocal optical system 40.

The semiconductor laser source 32 and the polarization beam splitter PBS are positioned so that S-polarized light of the modulated laser beam emitted by the semiconductor laser source 32 is reflected by the polarization beam splitter PBS. A collimating lens 51 for collimating the laser beam emitted from the semiconductor laser source 32 is positioned on the optical axis 32X of the semiconductor laser source 32. A condenser lens 52 for focusing the receiving parallel beam on the light receiving element 36 and a band-pass filter 54 are positioned on the optical axis 36X of the light receiving element 36. A condenser lens 53 for focusing the receiving parallel beam on the light receiving element 37 and a band-pass filter 55 are positioned on the optical axis 37X of the position detecting sensor 37. The incident surfaces 72 and 73 of the auxiliary prism 70 extend perpendicular to the optical axis 36X and the optical axis 32X, respectively, while the incident surfaces 82 and 83 of the auxiliary prism 80 extend perpendicular to the optical axis 37X and the optical axis 36X, respectively. In the first embodiment according to the second aspect of the present invention, the optical axis 32X of the semiconductor laser source 32, the optical axis 36X of the light receiving element 36 and the optical axis 37X of the position detecting sensor 37 all lie on a common plane which is coincident with a plane which includes the optical axis 10X of the first afocal optical system 10 and the optical axis 40X of the second afocal optical system 40.

The first embodiment of the integral transmitter-receiver optical communication apparatus having the aforementioned structure, according to the second aspect of the present invention, is utilized in a manner similar to a conventional integral transmitter-receiver optical communication apparatus; namely, by being generally positioned opposite to the semiconductor laser beam of an oppositely-positioned complementing optical communication apparatus having an identical structure, wherein the transmission range of the laser beam emitted by the semiconductor laser source 32 overlaps that emitted by the complementing semiconductor laser beam of the oppositely-positioned complementing optical communication apparatus, so that the laser beam modulated by the modulator 31 is received by the light receiving element 36 in each of the two mutually complementing optical communication apparatuses. The structure of the first embodiment of the integral transmitter-receiver optical communication apparatus, according to the second aspect of the present invention, the thickness of the apparatus (i.e., the horizontal length as viewed in FIG. 8) can be reduced due to the above described; i.e., wherein the optical axis 32X of the semiconductor laser source 32, the optical axis 36X of the light receiving element 36 and the optical axis 37X of the position detecting sensor 37 all lie on a common plane which is coincident with a plane including the optical axis 10X of the first afocal optical system 10 and the optical axis 40X of the second afocal optical system 40.

Figure 9:
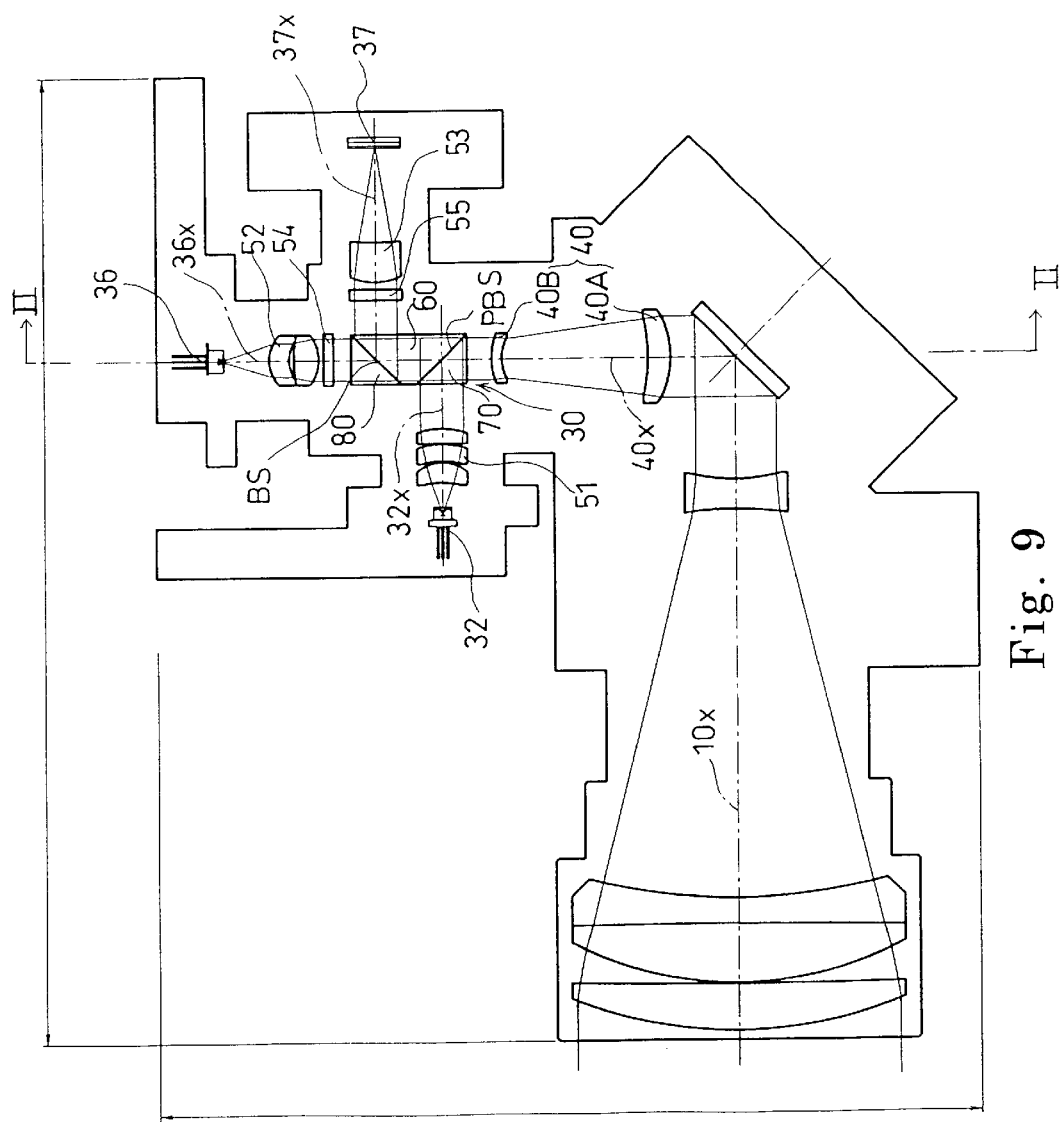
FIG. 9 is a vertical sectional view of the second embodiment of the integral transmitter-receiver optical communication apparatus according to the second aspect of the present invention.

FIG. 9 shows the second embodiment of the integral transmitter-receiver optical communication apparatus according to the second aspect of the present invention. In this embodiment, the orientation of the polarization beam splitting plane PBS and the beam splitting plane BS, which are respectively formed between the central prism 60 and the auxiliary prisms 70 and 80, differs from the orientation of the embodiment shown in FIG. 7 by 90 degrees, while the semiconductor laser source 32 and the position detecting sensor 37 are reversely arranged.

In each of the first and second embodiments shown in FIGS. 7 and 9 according to the second aspect of the integral transmitter-receiver optical communication apparatus, the optical axis 32X (of the semiconductor laser source 32), the optical axis 36X (of the light receiving element 36) and the optical axis 37X (of the position detecting sensor 37) all lie on a common plane which is coincident with a plane which includes the optical axis 10X of the first afocal optical system 10 and the optical axis 40X of the second afocal optical system 40. A cross sectional view taken along the II—II line shown in FIG. 9 is shown in FIG. 8.

Figure 10A:
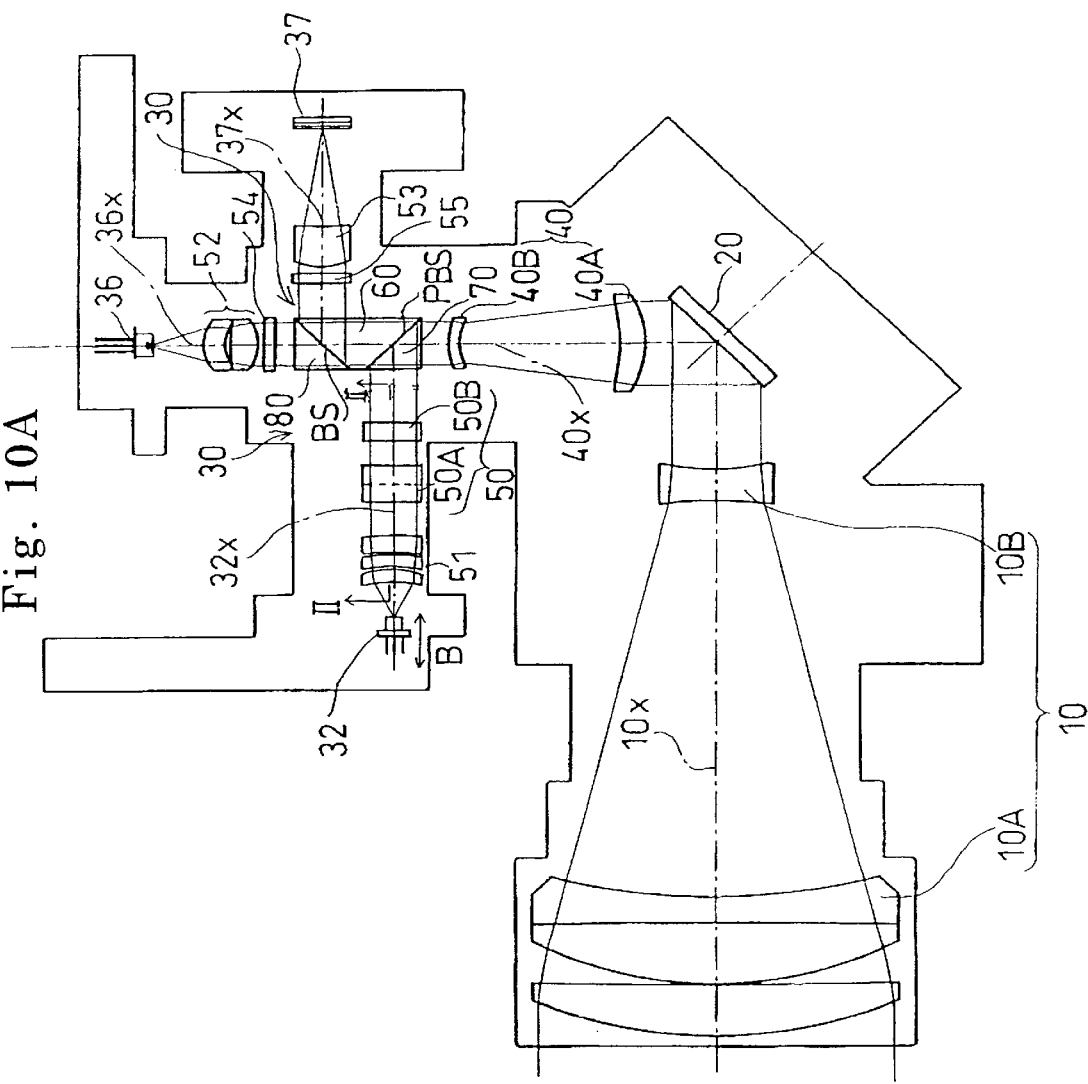
FIG. 10A is a vertical sectional view of the third embodiment of the integral transmitter-receiver optical communication apparatus according to the second aspect of the present invention.
Figure 10B:
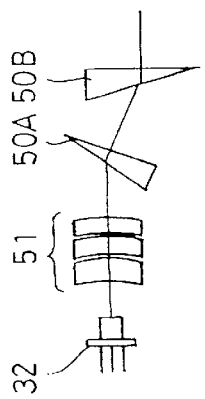
FIG. 10B is a cross sectional view taken along II—II line shown in FIG. 10A, looking in the direction of the appended arrows.

FIGS. 10A and 10B show the third embodiment of the integral transmitter-receiver optical communication apparatus according to the second aspect of the present invention. This embodiment is identical to the embodiment shown in FIG. 9 except that, in this third embodiment, an anamorphic optical system 50 is positioned between the collimating lens 51 for collimating the laser beam emitted from the semiconductor laser source 32 and the polarization beam splitting plane PBS. The anamorphic optical system 50 and the collimating lens 51 constitute a shaping optical system. The anamorphic optical system 50 includes a first prism 50A and a second prism 50B. The semiconductor laser source 32 emits a laser beam having a linear or elliptical cross sectional shape. The laser beam is collimated through the collimating lens 51 and subsequently formed into a circular cross sectional shape via the anamorphic optical system 50.

As is commonly known in the art, the laser beam emitted from the semiconductor laser source 32 has a linear or elliptical shaped intensity distribution, rather than a circular-shaped intensity distribution. FIG. 3 schematically shows such an intensity distribution having an elliptical shape determined by length θH in the θ-parallel direction and length θV in the θ-perpendicular direction, as described above. Note that the length θH in the θ-parallel direction is the direction of vibration of the linearly polarization, wherein the direction to adjust the laser beam so that the emergent laser beam from the anamorphic laser beam has a circular cross section is perpendicular to the page of FIG. 10A. By changing the cross sectional shape of the laser beam emitted from the semiconductor laser source 32 into a circular cross sectional shape via the anamorphic optical system 50, the telescopic optical system of the complementing optical communication apparatus can receive the transmitting laser beam in a wide range. Consequently, the complementing optical communication apparatus can easily receive the transmitting laser beam emitted from the semiconductor laser source 32 (of this embodiment) of the optical communication apparatus.

In this third embodiment of the integral transmitter-receiver optical communication apparatus according to the second aspect of the present invention, it can be appreciated from FIGS. 10A and 10B that a first plane which includes the optical axes of the semiconductor laser source 32 and the collimating lens 51, and a second plane which includes the optical axes of the light receiving element 36 and the position detecting sensor 37, are parallel to each other, rather than coincident with each other. The distance between the first and second planes is quite short, almost the. same as the beam diameter of the laser beam whose cross-sectional shape is changed by the prisms 50A and 50B, so that the thickness of the apparatus can be reduced similarly to the previous embodiments shown in FIGS. 7 and 9.

The semiconductor laser source 32 is adjustable along the optical axis direction (in the direction of an arrow "B" shown in FIG. 10A) relative to the collimating lens 51. The ratio of the length θH in the θ-parallel direction to the length θV in the θ-perpendicular direction of the intensity distribution of the laser beam emitted from the semiconductor laser source 32 can be adjusted by adjusting the axial position of the semiconductor laser source 32 relative to the collimating lens 51 to obtain the laser beam having a circular intensity distribution. The magnification of the anamorphic optical system 50 is constant, but the ratio of the length θH in the θ-parallel direction to the length θV in the θ-perpendicular direction of the intensity distribution of the laser beam emitted from the semiconductor laser source 32 is not always the same. However, the ratio of the length θH in the θ-parallel direction to the length θV in the θ-perpendicular direction can be adjusted during assembly by adjusting the axial position of the semiconductor laser source 32 relative to the collimating lens 51 to obtain the laser beam having a circular intensity distribution. The device for moving the semiconductor laser source 32 can be a conventional lens moving device.

The fourth and fifth embodiments of the integral transmitter-receiver optical communication apparatus according to the second aspect of the present invention will be hereinafter discussed.

Figure 11:
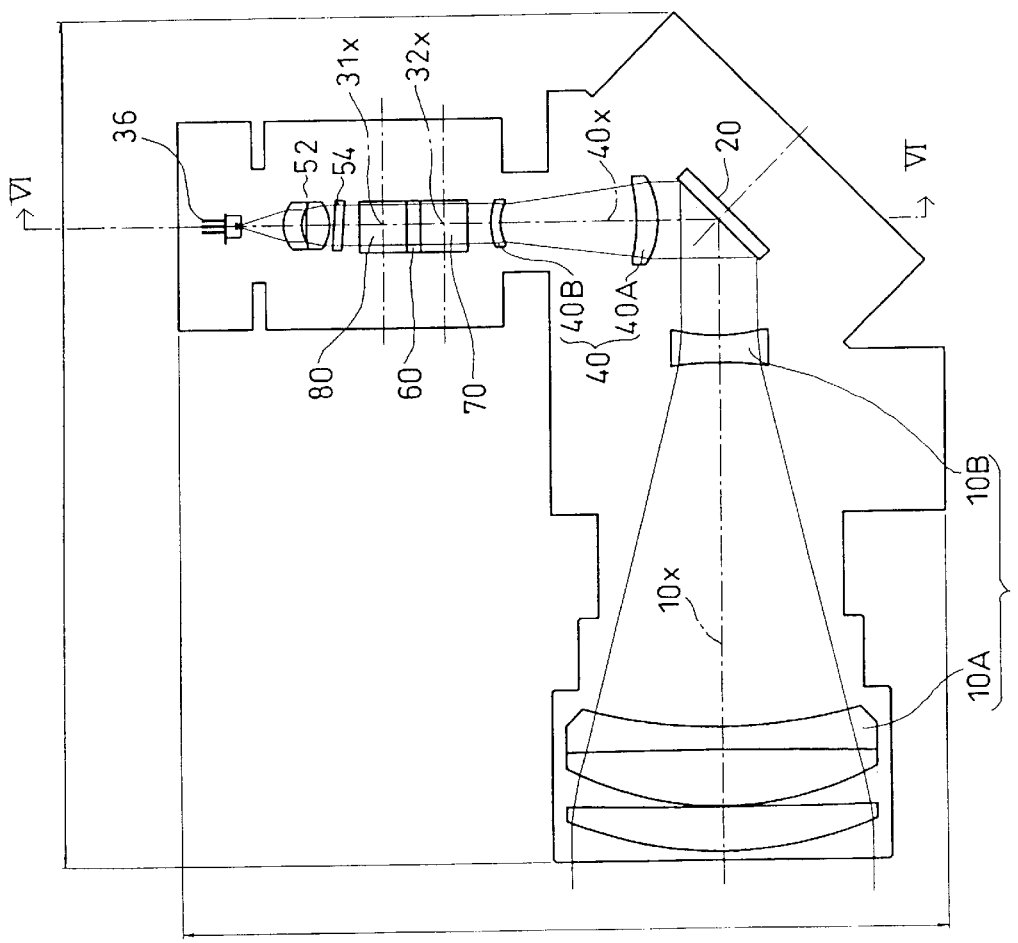
FIG. 11 is a vertical sectional view of the fourth embodiment of the integral transmitter-receiver optical communication apparatus according to the second aspect of the present invention.
Figure 12:
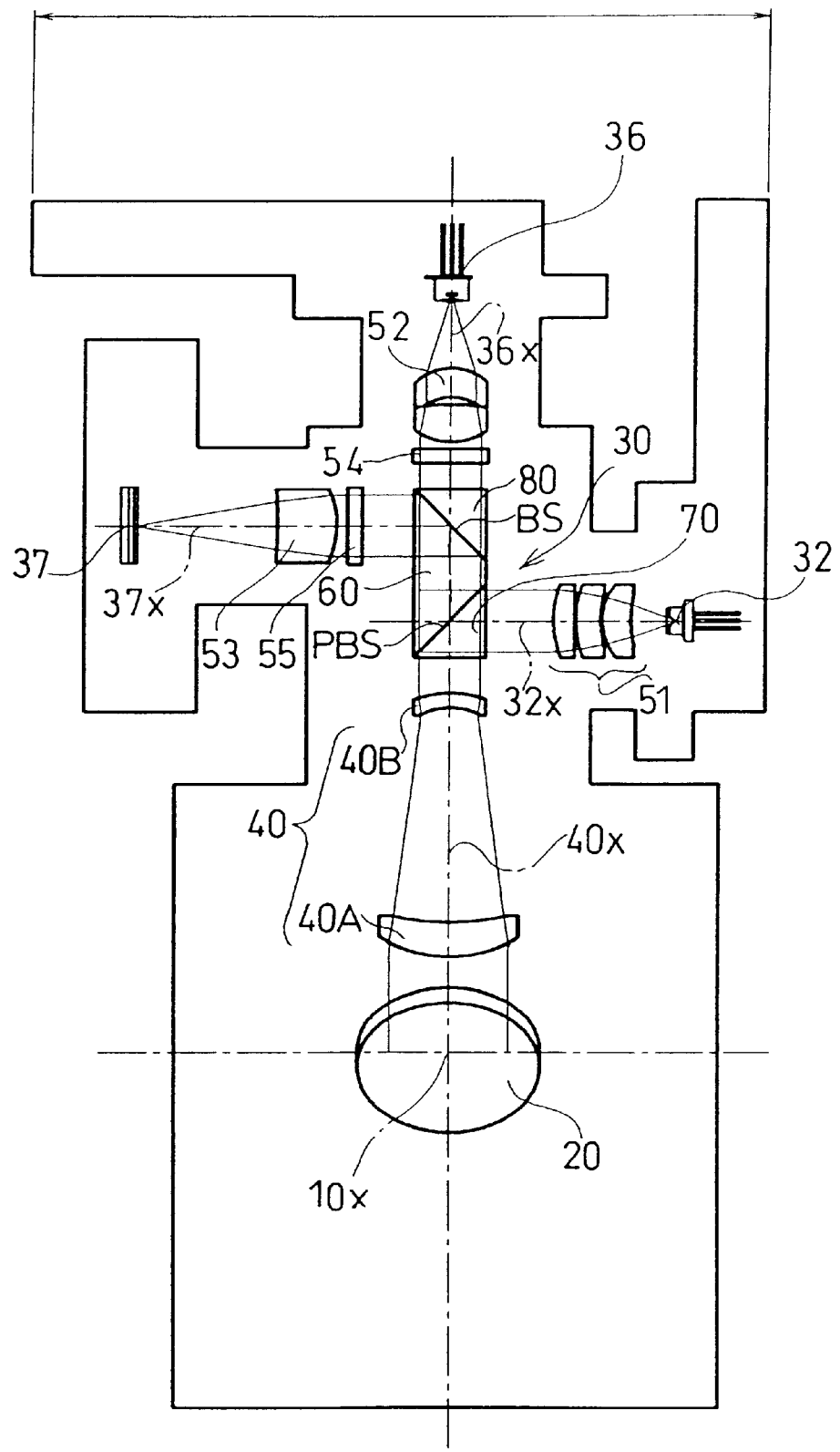
FIG. 12 is a cross sectional view taken along VI—VI line shown in FIG. 11.

FIGS. 11 and 12 show the fourth embodiment of the integral transmitter-receiver optical communication apparatus according to the second aspect of the present invention. The fundamental elements of this fourth embodiment are identical to those in the first embodiment shown in FIG. 7. However, in this fourth embodiment, a plane which includes the optical axis 32X (of the semiconductor laser source 32), the optical axis 36X (of the light receiving element 36) and the optical axis 37X (of the position detecting sensor 37) is perpendicular to a plane which includes the optical axes 10X and 40X of the first and second afocal optical systems 10 and 40. According to the structure of the fourth embodiment shown in FIG. 11, the thickness of the apparatus (i.e., the horizontal length as viewed in FIG. 11), more specifically, the width of the transmitter-receiver unit 30 in the horizontal length as viewed in FIG. 11, can be reduced.

Figure 13A:
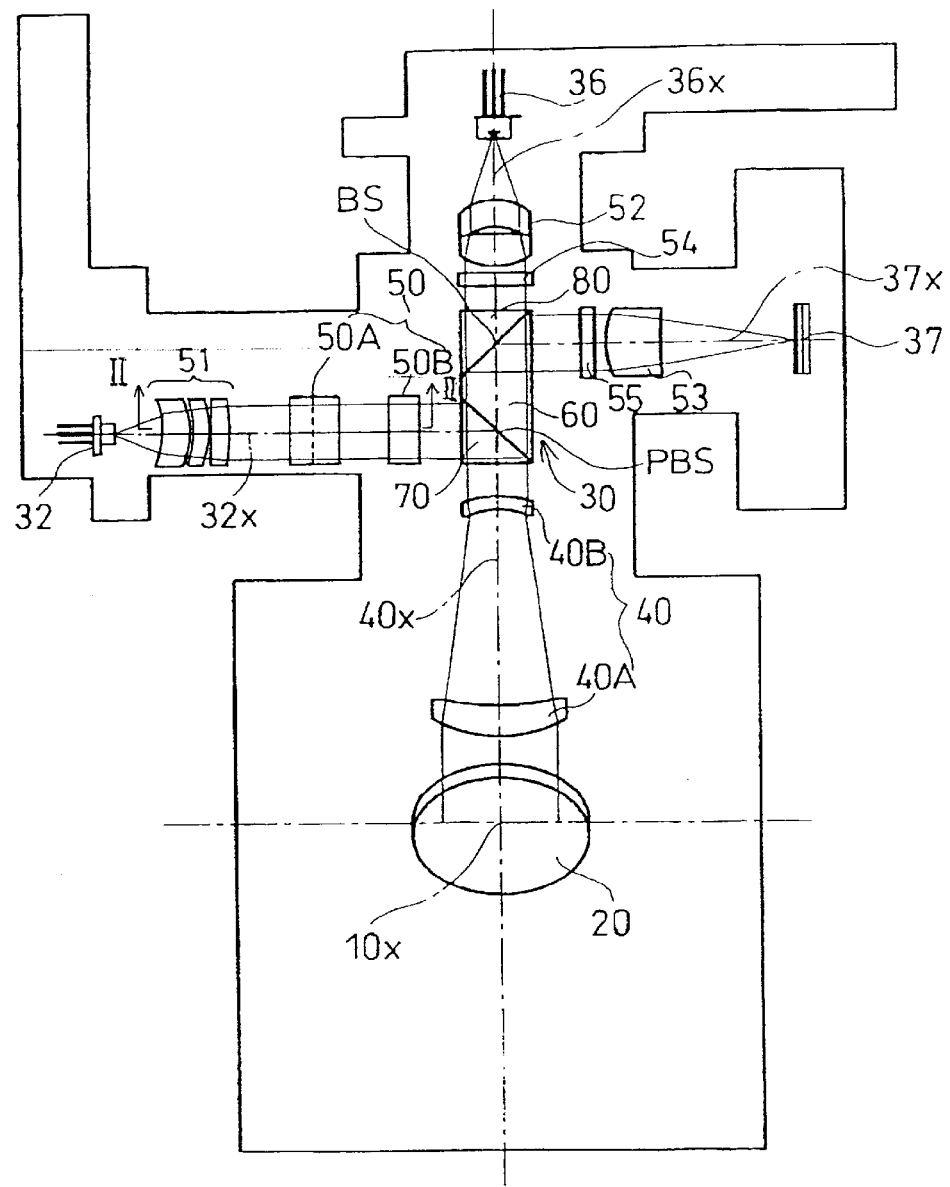
FIG. 13A is a vertical sectional view of the fifth embodiment of the integral transmitter-receiver optical communication apparatus according to the second aspect of the present invention.
Figure 13B:
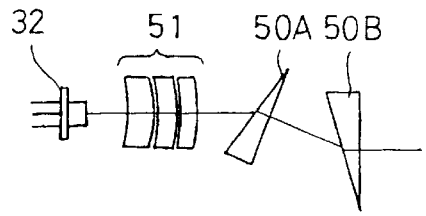
FIG. 13B is a cross sectional view taken along II—II line shown in FIG. 13A, looking in the direction of the appended arrows.

FIGS. 13A and 13B show the fifth embodiment of the integral transmitter-receiver optical communication apparatus according to the second aspect of the present invention. The fundamental elements of this fifth embodiment are identical to those in the third embodiment shown in FIGS. 10A and 10B. However, in this fifth embodiment, a first plane which includes the optical axes of the semiconductor laser source 32 and the collimating lens 51, and a second plane which includes the optical axes 36X and 37X of the light receiving element 36 and the position detecting sensor 37, extend perpendicular to a plane which includes the optical axes 10X and 40X of the first and second afocal optical systems 10 and 40.

In the illustrated embodiments shown in FIGS. 9 through 13, members or elements whose structures are not illustrated are identical to those in the embodiments shown in FIGS. 7 and 8 and are designated by the same reference designators.

The beam diameter of the transmitting laser beam emitted from the telescopic optical system 10 can be adjusted by adjusting the position of the second lens group 40B of the second afocal optical system 40, so that a stable optical communication can be carried out by adjusting the beam diameter of the transmitting laser beam at the complementing telescopic optical system of the complementing optical communication apparatus to be slightly greater than the diameter of the receiving range of the complementing telescopic optical system of the complementing optical communication apparatus in accordance with the distance between the two mutually complementing optical communication apparatuses. Further, since two afocal optical systems (the first and second afocal optical systems 10 and 40) are respectively positioned before and after the light beam deflecting device (the deflection mirror 20), the deflection mirror 20 and the following optical systems provided after the deflection mirror 20 can be miniaturized without deteriorating the image quality.

Figure 15:
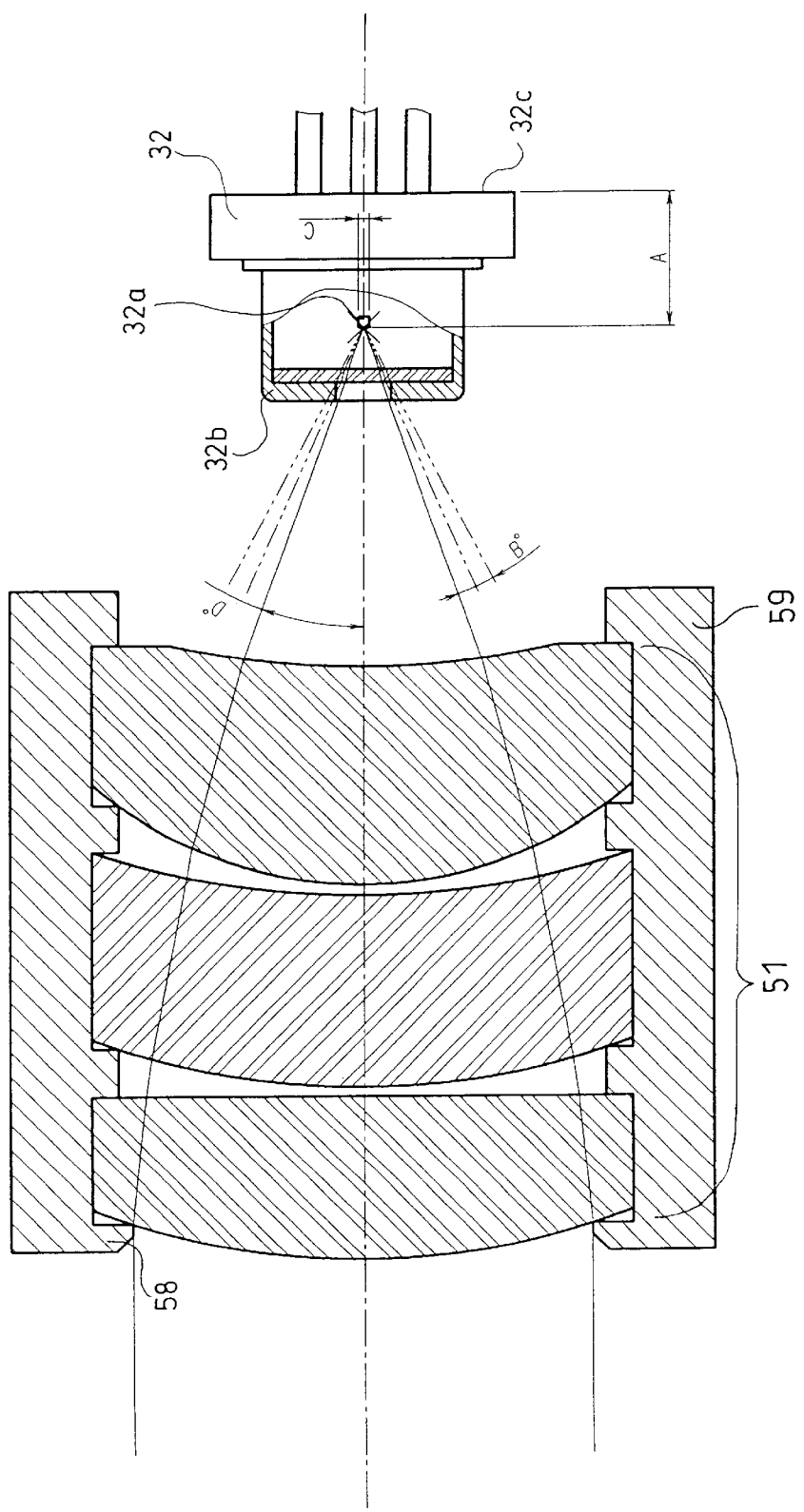
FIG. 15 is a cross sectional view of a semiconductor laser source, a collimating lens and a lens holder of the collimating lens shown in FIG. 14, showing the relationship between a diaphragm portion formed on the lens holder and the numerical aperture of the laser beam emitted from the semiconductor laser source.

FIGS. 14A, 14B and 15 show an embodiment of the integral transmitter-receiver optical communication apparatus according to the third aspect of the present invention. This embodiment is different from the embodiment shown in FIG. 1A in that a diaphragm portion 58 formed at the front end of a lens holder 59 holds the collimating lens group 51 therein, as shown in FIG. 15. Except for this additional structure, the embodiment shown in 14A, 14B and 15 is identical to that shown in FIG. 1A. In FIG. 14A, 14B and 15, members or elements similar to those shown in FIG. 1A are designated by the same reference designators.

FIG. 15 shows the positional relationship of the semiconductor laser source (laser diode) 32, the collimating lens 51 and the diaphragm portion (light interceptive member) 58. The semiconductor laser source 32 is provided with a laser emitting portion 32a and a light-interceptive cover 32b having an aperture at the center thereof, wherein the laser beam is emitted therethrough by the laser emitting portion 32a to be subsequently incident on the collimating lens 51. The semiconductor laser source 32 is further provided at a base thereof with a reference surface 32c which is utilized for the fixation thereof. Due to minor manufacturing differences, the distance "A" from the reference surface 32c to the laser emitting portion 32a in one semiconductor laser source 32 is not always exactly the same as that in complementing semiconductor laser source 32. Likewise, although the optical axis of the laser emitting portion 32a and the optical axis of the collimating lens group 51 are preferably coincident with each other, in practice the optical axis of the laser emitting portion 32a deviates from the optical axis of the collimating lens group 51 within an amount of deviation "C". Consequently, the angle of divergence (numerical aperture) of the laser beam emitted from the semiconductor laser diode 32 deviates within an angle "B", wherein "D" represents the minimum angle of divergence. The light-interceptive cover 32b prevents such a deviation from occurring by limiting the angle of divergence of the laser beam emitted from the semiconductor laser diode 32 to make the numerical aperture constant. This numerical aperture is different in the θ-parallel and θ-vertical directions, so that the larger numerical aperture (i.e., the numerical aperture in the θ-vertical direction) is herein determined as a nominal minimum numerical aperture.

The collimating lens 51 itself has a numerical aperture which is sufficiently larger than the maximum numerical aperture of the semiconductor laser source 32, while the diaphragm portion 58 functions to make the numerical aperture of the collimating lens 51 smaller than the nominal minimum numerical aperture of the semiconductor laser diode 32. Namely, the diaphragm portion 58 reduces the quantity of light emitted from the collimating lens 51. In practice, the diaphragm portion 58 is preferably formed to make the numerical aperture of the collimating lens 51 approximately 80 to 90 percent of the numerical aperture of the semiconductor laser source 32. In other words, the diaphragm portion 58 is preferably formed to reduce the quantity of light emitted from the collimating lens 51 by approximately 10 to 20 percent by cutting off a peripheral part of the laser beam emitted from the collimating lens 51. For instance, when the nominal minimum numerical aperture of the semiconductor laser diode 32 is set to "0.4", the diaphragm portion 58 which makes the numerical aperture of the collimating lens 51 "0.34" can be used.

Upon installation of the above-described integral transmitter-receiver optical communication apparatus, a complementing apparatus which is identical thereto is also installed, so that these mutually complementing apparatuses are fixed at a predetermined distance apart from each other, and subsequently the direction of light transmitted by one of the mutually complementing apparatuses to the other must be finely adjusted, wherein the optical communication apparatus transmits signals (modulated laser beam) towards the complementing optical communication apparatus which receives the transmitted signals. The laser beam emitted from the semiconductor laser source 32 is projected towards the anamorphic optical system 50 through the collimating lens group 51, whose numerical aperture is made smaller than the numerical aperture of the semiconductor laser source 32 by the diaphragm portion 58, and then the laser beam is formed into a circular shaped cross section via the anamorphic optical system 50. Consequently, the peripheral edge of a cross section of the transmitting laser beam which is transmitted to the oppositely-positioned complementing apparatus via the telescopic optical system 10 is sharp, which facilitates the operation of adjusting the direction of the laser beam transmitted by one of the two mutually complementing apparatuses relative to the other.

The integral transmitter-receiver optical communication apparatus having the aforementioned structure is utilized by being generally positioned opposite to the complementing semiconductor laser beam of a complementing optical communication apparatus having an identical structure, wherein the transmission range of the laser beam emitted by the semiconductor laser source 32 overlaps that emitted by the complementing semiconductor laser beam of the complementing optical communication apparatus, so that the laser beam modulated by the modulator 31 is received by the light receiving element 36 in each of the two mutually complementing optical communication apparatuses.

Accordingly, the complementing optical communication apparatus can easily receive the transmitting laser beam emitted from the semiconductor laser source 32 of the present embodiment of the optical communication apparatus because the transmitting laser beam is formed to have a circular intensity distribution by the anamorphic optical system 50, which gives a wide receiving range to the telescopic optical system of the complementing optical communication apparatus. The beam diameter of the transmitting laser beam emitted from the telescopic optical system 10 can be adjusted by adjusting the position of the second lens group 40B of the second afocal optical system 40, so that stable optical communication can be carried out by adjusting the beam diameter of the transmitting laser beam at a position of the complementing telescopic optical system of the complementing optical communication apparatus to be slightly greater than the diameter of the receiving range of the telescopic optical system of the complementing optical communication apparatus in accordance with the distance between the two mutually complementing optical communication apparatuses. Further, since two afocal optical systems (the first and second afocal optical systems 10 and 40) are respectively positioned before and after the light beam deflecting device (the deflection mirror 20), the deflection mirror 20 and the following optical systems provided after the deflection mirror 20 can be miniaturized without deteriorating the image quality.

In the first embodiment of the integral transmitter-receiver optical communication apparatus according to the third aspect of the present invention that is shown in FIGS. 14A, 14B and 15, the anamorphic optical system 50, which forms the cross sectional shape of a laser beam into a substantially circular shape, is positioned between the semiconductor laser source 32 and the polarization beam splitter 33, however, the present invention can also be applied to this embodiment without the anamorphic optical system 50.

Figure 16:
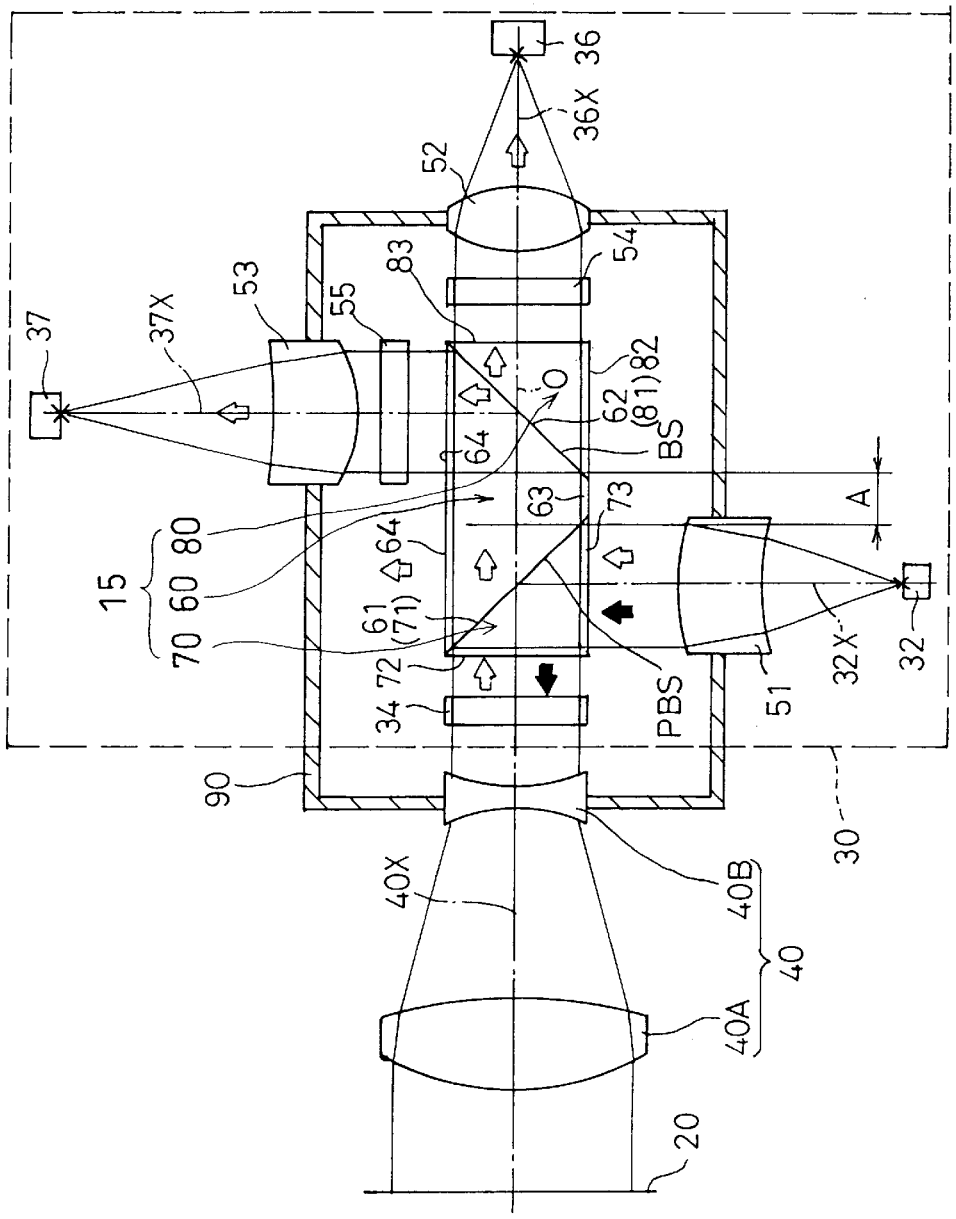
FIG. 16 is a cross sectional view of the first embodiment of the integral transmitter-receiver optical communication apparatus according to the fourth aspect of the present invention.

FIG. 16 shows the first embodiment of the integral transmitter-receiver optical communication apparatus according to the fourth aspect of the present invention. This embodiment according to the fourth aspect of the present invention is provided with a crosstalk preventive device. In FIG. 16, members or elements similar to those shown in FIG. 24 are designated by the same reference designators. There is provided a second afocal optical system 40 between the deflection mirror 20 and the transmitter-receiver unit 30. The second afocal optical system 40 is provided with a first lens group 40A having a positive power and a second lens group 40B having a negative power, in that order from the deflection mirror 20 toward the transmitter-receiver unit 30. The second afocal optical system is an optical system of zero convergent power, the focal points thereof being infinitely distant, so that the light beam which emerges from the second afocal optical system 40 is a substantially parallel beam if the light beam which enters the second afocal optical system 40 is a substantially parallel beam, but the beam diameter of the light beam incident on the afocal optical system is decreased therethrough in the direction from the object side to the deflection mirror 20 which functions as a light beam deflecting device. The reduction ratio of the diameter (magnification) of the telescopic optical system (i.e., first afocal optical system) 10 can be set to a ratio of approximately one to four (four times), while the reduction ratio of the diameter (magnification) of the second afocal optical system 40 can be set to a ratio of approximately one to two (two times).

The transmitter-receiver unit 30 is provided with a beam splitting unit (beam splitting device) 15 which includes a central prism 60 and a couple of auxiliary prisms 70 and 80. The central prism 60 is an incomplete right-angled prism, while each of the couple of auxiliary prisms 70 and 80 is a right-angled prism. The central prism 60 includes two adhesive surfaces 61 and 62 whose extended surfaces (imaginary planes) are angled relative to each other by a right angle (90 degrees). Each of the two adhesive surfaces 61 and 62 is angled relative to an optical axis 40X of the second afocal optical system 40 by 45 degrees. The central prism 60 is provided with flat surfaces 63 and 64 which extend parallel to an optical axis O. Each of the flat surfaces 63 and 64 is angled relative to each of the adhesive surfaces 61 and 62 by 45 degrees. The flat surface 63, which is narrower than the flat surface 64, separates the adhesive surfaces 61 and 62 apart from each other in the direction of the optical axis 36X of the light receiving element 36 by a distance "A" shown in FIG. 16.

The auxiliary prism 70 includes an adhesive surface 71 which is attached to the adhesive surface 61 by an adhesive. The auxiliary prism 70 further includes incident/exit surfaces 72 and 73 which are angled relative to each other by a right angle, while each of the incident/exit surfaces 72 and 73 is angled relative to the adhesive surface 71 by 45 degrees. Likewise, the auxiliary prism 80 includes an adhesive surface 81 which is attached to the adhesive surface 62 by an adhesive. The auxiliary prism 80 further includes incident/exit surfaces 82 and 83 which are angled relative to each other by a right angle, while each of the incident/exit surfaces 82 and 83 is angled relative to the adhesive surface 81 by 45 degrees.

A polarization beam splitting thin layer is interposed between the adhesive surface 61 of the central prism 60 and the adhesive surface 71 of the auxiliary prism 70 to form the polarization beam splitting plane PBS therebetween. A beam splitting thin layer is interposed between the adhesive surface 62 of the central prism 60 and the adhesive surface 81 of the auxiliary prism 80 to form the beam splitting plane BS therebetween. The polarization beam splitting plane PBS is angled relative to the optical axis 40X (of the second afocal optical system 40) and the optical axis 32X (of the semiconductor laser source 32) by 45 degrees. The beam splitting plane BS is angled relative to the optical axis 40X (of the second afocal optical system 40) and the optical axis 37X (of the position detecting sensor 37) by 45 degrees. The optical axis 36X of the light receiving element 36 is coincident with the optical axis 40X of the second afocal optical system 40.

A collimating lens 51 for collimating the laser beam emitted from the semiconductor laser source 32 is positioned on the optical axis 32X of the semiconductor laser source 32. A condenser lens 52 for focusing the received parallel beam on the light receiving element 36 and a band-pass filter 54 are positioned on the optical axis 36X of the light receiving element 36. A condenser lens 53 for focusing the received parallel beam on the light receiving element 37 and a band-pass filter 55 are positioned on the optical axis 37X of the position detecting sensor 37. The incident surfaces 72 and 73 of the auxiliary prism 70 extend perpendicular to the optical axis 36X and the optical axis 32X, respectively, while the incident surfaces 82 and 83 of the auxiliary prism 80 extend perpendicular to the optical axis 37X and the optical axis 36X, respectively. The locations of the light receiving element 36 and the position detecting sensor 37 can be exchanged. It should be noted that a supporting member (omitted from FIG. 16) to which the auxiliary prisms 70 and 80 are adhered is supported by a casing 90 thereinside.

The semiconductor laser source 32 and the polarization beam splitter PBS are positioned so that S-polarized light of the modulated laser beam emitted by the semiconductor laser source 32 is reflected by the polarization beam splitter PBS. The S-polarized light, which is emitted from the semiconductor laser source 32 and subsequently collimated by the collimating lens 51 to be then reflected by the polarization beam splitter PBS, is projected towards the oppositely-positioned complementing optical communication apparatus via the second afocal optical system 40, the deflection mirror 20 and the telescopic optical system 10. On the other hand, the receiving laser beam that passes through the auxiliary prism 70, the central prism 60 and the auxiliary prism 80 of the transmitter-receiver unit 30 (via the telescopic optical system 10, the deflection mirror 20 and the second afocal optical system 40) is also a parallel beam, so that the problem of a polarization beam splitter changing its transmittance and reflectance in accordance with a variation in the angle of incidence of the incident light on the polarization beam splitter is prevented from occurring. The λ/4 retardation plate 34 is provided for changing the P-polarized light received from the complementing opposite optical communication apparatus into S-polarized light by rotating the plane of polarization of the incident laser beam by 90 degrees.

The integral transmitter-receiver optical communication apparatus having the aforementioned structure is utilized in a manner similar to a conventional integral transmitter-receiver optical communication apparatus. Namely, the present embodiment of the optical communication apparatus is utilized by being generally positioned opposite to a complementing semiconductor laser beam of a complementing optical communication apparatus having an identical structure, wherein the transmission range of the laser beam emitted by the semiconductor laser beam 32 overlaps a laser beam emitted by the complementing semiconductor laser beam of the complementing optical communication apparatus, so that the laser beam modulated by the modulator 31 is received by the light receiving element 36 in each of the two mutually complementing optical communication apparatuses. In theory, 100 percent of the S-polarized laser beam emitted from the semiconductor laser source 32 is reflected by the polarization beam splitting plane PBS to be projected outwardly via the second afocal optical system 40, the deflection mirror 20 and the telescopic optical system 10. However, in practice, a small percentage of the S-polarized laser beam (stray light/infiltrating light) emitted from the semiconductor laser source 32 passes through the polarization beam splitting plane PBS to reach the position detecting sensor 37 or the light receiving element 36, which may cause crosstalk between the transmitting laser beam emitted from the semiconductor laser source 32 and the receiving laser beam incident upon each of the light receiving element 36 and the position detecting sensor 37. Namely, when the P-polarized laser beam emitted from the oppositely-positioned complementing optical communication apparatus passes through the polarization beam splitting plane PBS to be received by the light receiving element 36 and the position detecting sensor 37 after being split into two separate beams by beam splitting plane BS, the respective laser beams received by the light receiving element 36 and the position detecting sensor 37 may get crossed by the above described stray light of the S-polarized laser beam, so that there is a possibility of the laser beam received by the light receiving element 36 and/or the laser beam received by the position detecting sensor 37, suffering from the crosstalk.

However, according to the first embodiment of the integral transmitter-receiver optical communication apparatus according to the fourth aspect of the present invention, the central prism 60 is provided with the flat surface 63 which separates the adhesive surfaces 61 and 62 apart from each other in the direction of the optical axis 36X of the light receiving element 36, which reduces the possibility of the laser beam (emitted from the semiconductor laser source 32 to pass through the polarization beam splitting plane PBS) partly proceeding as infiltrating light towards the beam splitting plane BS to enter the position detecting sensor 37 and/or the light receiving element 36. Consequently, the occurrence of crosstalk due to such infiltrating light can be prevented. Accordingly, the central prism 60 having the flat surface 63 is an element of the crosstalk preventive device of this first embodiment of the integral transmitter-receiver optical communication apparatus according to the fourth aspect of the present invention.

Figure 17:
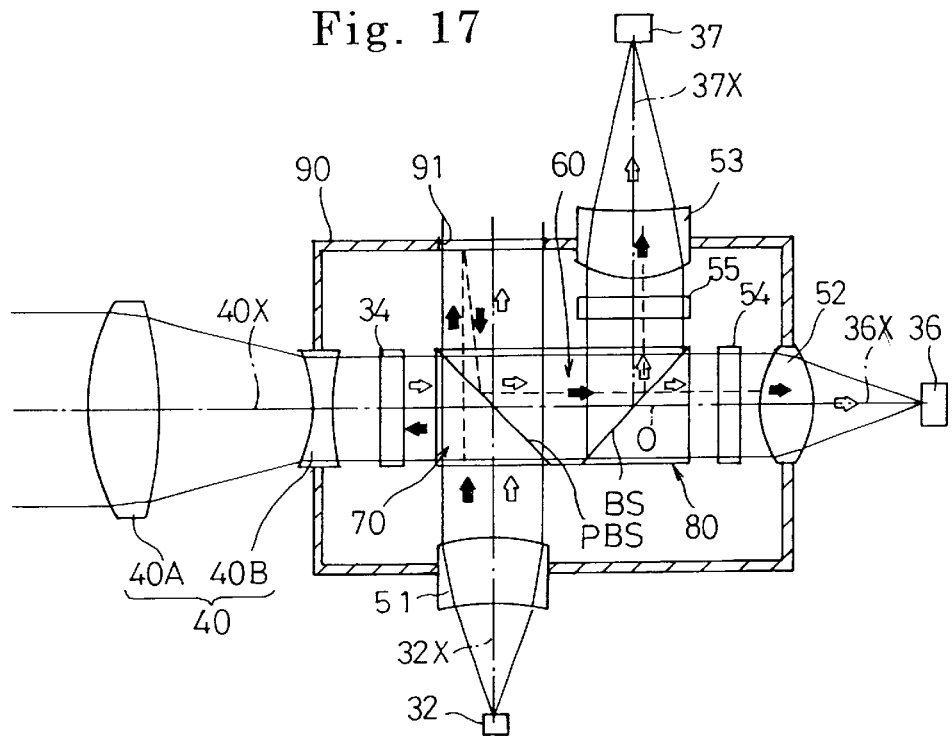
FIG. 17 is a cross sectional view of the second embodiment of the integral transmitter-receiver optical communication apparatus according to the fourth aspect of the present invention.

FIG. 17 shows the second embodiment of the integral transmitter-receiver optical communication apparatus according to the fourth aspect of the present invention. In this embodiment, a casing 90 is provided, on a light path of the polarization beam splitting plane PBS, with an opening 91 for positively allowing the light (which is emitted from the semiconductor laser source 32 to pass through the collimating lens 51 and the polarization beam splitting plane PBS) to exit the casing 90.

Figure 18:
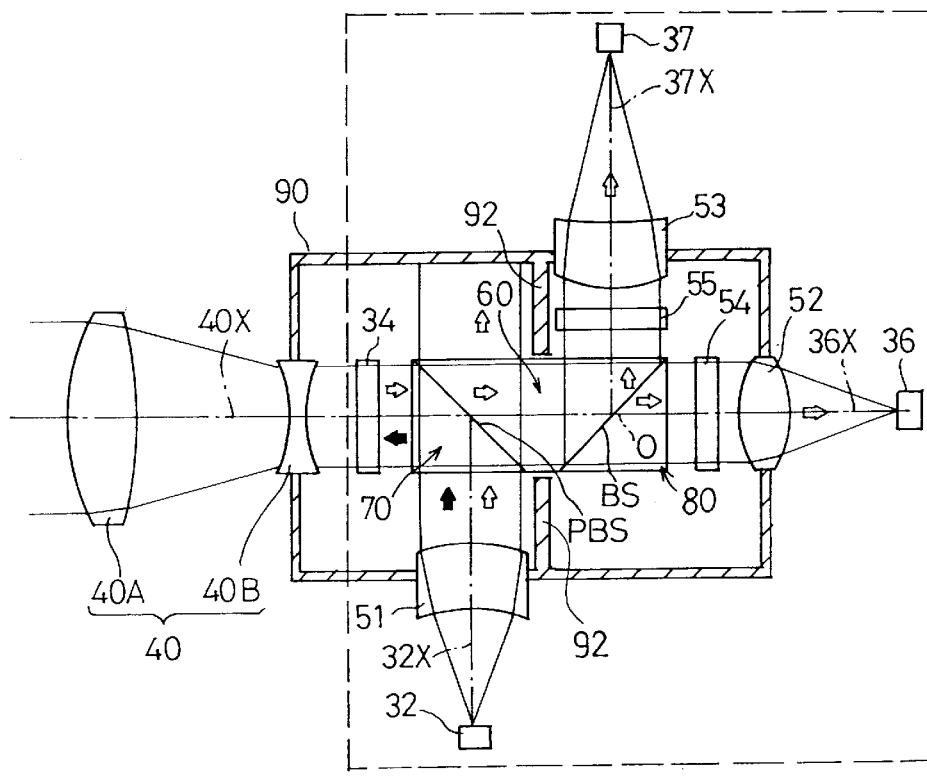
FIG. 18 is a cross sectional view of the third embodiment of the integral transmitter-receiver optical communication apparatus according to the fourth aspect of the present invention.

FIG. 18 shows the third embodiment of the integral transmitter-receiver optical communication apparatus according to the fourth aspect of the present invention. In this embodiment, the light which is emitted from the semiconductor laser source 32 to pass through the polarization beam splitting plane PBS is prevented from reaching either the position detecting sensor 37 or the light receiving element 36 by means of providing the casing 90 with a (light interceptive wall) 92 positioned around a border between the polarization beam splitting plane PBS and the beam splitting plane BS. The structures of the second and third embodiments of the integral transmitter-receiver optical communication apparatus shown in FIGS. 17 and 18 according to the fourth aspect of the present invention are identical to that of the first embodiment shown in FIG. 16 except for the added opening 91 or the added wall 92, so that other members or elements in the second and third embodiments shown in FIGS. 17 and 18 which are similar to those in the first embodiment shown in FIG. 16 are designated by the same reference designators and therefore will not be herein discussed. The second and third embodiments can be combined; i.e., the casing 90 can be provided with both the opening 91 and the wall 92. Furthermore, the orientation of the semiconductor laser source 32 and the set-up thereof can be used together with the mechanical structures shown in FIGS. 16 through 18.

Figure 19:
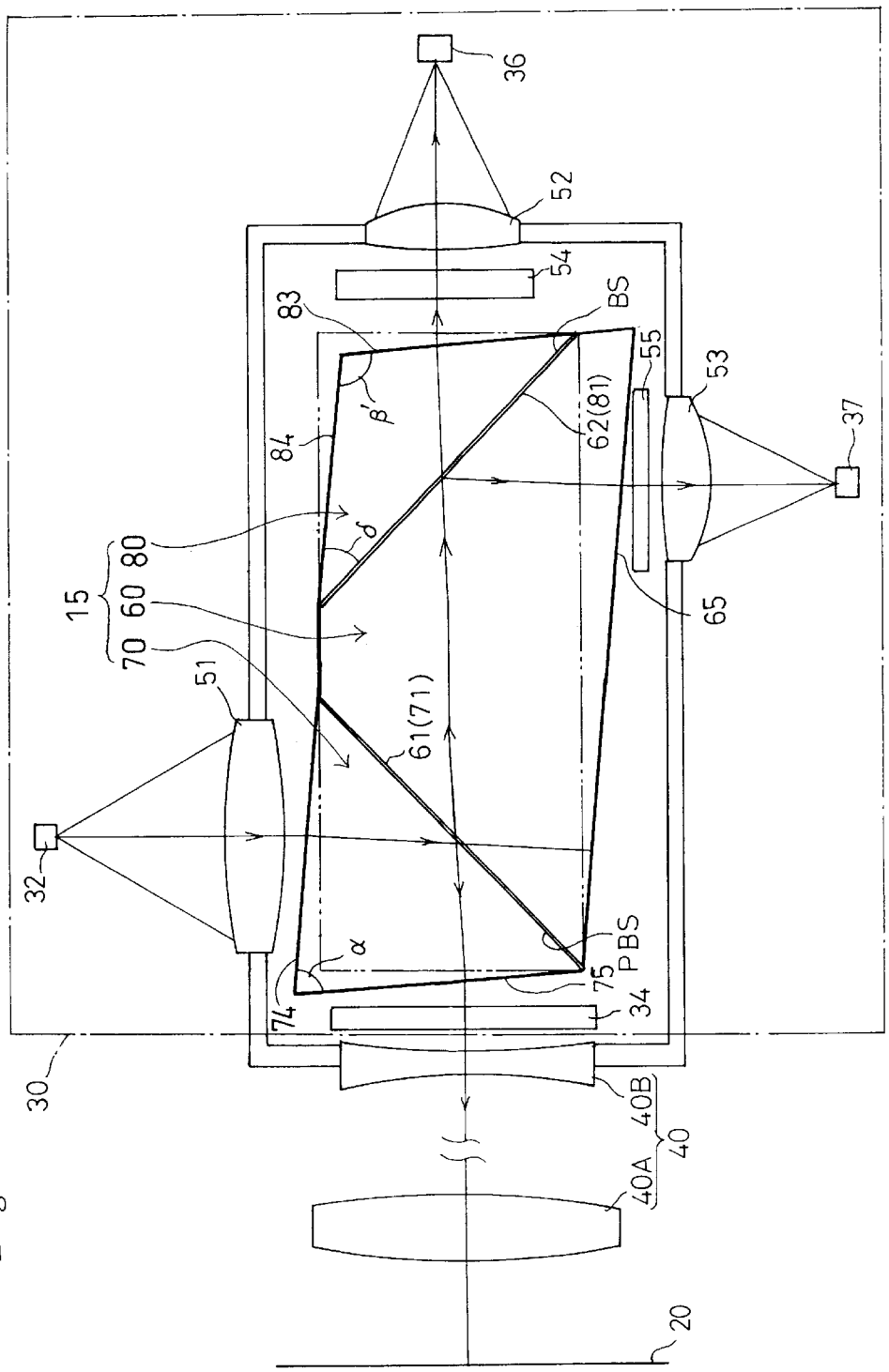
FIG. 19 is a cross sectional view of the first embodiment of the integral transmitter-receiver optical communication apparatus according to the fifth aspect of the present invention.

FIG. 19 shows the first embodiment of the integral transmitter-receiver optical communication apparatus according to the fifth aspect of the present invention. In FIG. 19, members or elements similar to those shown in FIG. 24 are designated by the same reference designators. This embodiment of the optical communication apparatus is provided, between the deflection mirror 20 and the transmitter-receiver unit 30, with a second afocal optical system 40. The second afocal optical system 40 includes a first lens group 40A having a positive power and a second lens group 40B having a negative power, in this order from the side of the deflection mirror 20 to the side of the transmitter-receiver unit 30. The second afocal optical system 40 is an optical system of zero convergent power, whose focal points are infinitely distant, so that the light beam which emerges from the second afocal optical system 40 is a substantially parallel beam if the light beam which enters the second afocal optical system 40 is a substantially parallel beam. However, the beam diameter of the light beam incident on the afocal optical system is decreased therethrough in the direction from the object side to the side of the transmitter-receiver unit 30. The reduction ratio of the diameter (magnification) of the telescopic optical system (i.e., first afocal optical system) 10 can be set to a ratio of approximately one to four (four times), while the reduction ratio of the diameter (magnification) of the second afocal optical system 40 can be made to be a ratio of approximately one to two (two times).

The transmitter-receiver unit 30 is provided with a beam splitting unit (beam splitting device) 15 which includes a central prism 60 and a couple of auxiliary prisms 70 and 80. The central prism 60 includes two adhesive surfaces 61 and 62 whose surfaces (extended imaginary planes) are angled relative to each other by a right angle (90 degrees). Each of the two adhesive surfaces 61 and 62 is angled relative to an optical axis 40X of the second afocal optical system 40 by 45 degrees.

The auxiliary prism 70 is formed to have an isosceles-triangle cross-section having a vertex angle α of less than 90 degrees, while the auxiliary prism 80 is formed to have an isosceles-triangle cross-section having a vertex angle β of more than 90 degrees. A base surface 71 of the auxiliary prism 70 is an adhesive surface which is adhered to the adhesive surface 61 of the central prism 60, and a base surface 81 of the auxiliary prism 80 is an adhesive surface which is adhered to the adhesive surface 62 of the central prism 60. A polarization beam splitting thin layer is interposed between the adhesive surface 61 of the central prism 60 and the adhesive surface 71 of the auxiliary prism 70 to form the polarization beam splitting plane PBS therebetween. A beam splitting thin layer is interposed between the adhesive surface 62 of the central prism 60 and the adhesive surface 81 of the auxiliary prism 80 to form the beam splitting plane BS therebetween.

A light incident surface 74 and a light incident/exit surface 75 form the vertex angle α therebetween. The light incident surface 74 faces the collimating lens 51, while the light incident/exit surface 75 faces the afocal optical system 40. One of the two side surfaces which form a vertex angle β' of the auxiliary prism 80 is a light exit surface 83 which faces a band-pass filter 54. The condenser lens 52 for the light receiving element 36 is positioned between a band-pass filter 54 and the light receiving element 36. The vertex angle α of the auxiliary prism 70 and the vertex angle β of the auxiliary prism 80 are determined so that reflected light (including light that has already been reflected) at a phase boundary between the prisms 70, 80 and the surrounding air therearound, does not enter the light receiving element 36, the position detecting sensor 37 or the semiconductor laser source 32; when a laser beam is incident on or emergent from the light incident surface 74, the light incident/exit surface 75 or the light exit surface 83. A band-pass filter 55 is disposed between the condenser lens 53 and the central prism 60.

Likewise, the angle of a light exit surface 65 of the central prism 60 which faces the band-pass filter 55 is determined so that reflection light at the phase boundary of the light exit surface 65 cannot enter the position detecting sensor 37 when a laser beam is incident on or emergent from the light exit surface 65. The respective angles of the light incident surface 74, the light incident/exit surface 75, the light exit surface 83 and the light exit surface 65 can be freely determined in accordance with the dimensions of the light receiving element 36 and the position detecting sensor 37, the focal lengths of the condenser lenses 52 and 53, etc. However, in practice, considering the quality of prisms in manufacturing and the inspection thereof when they are fixed, it is preferable that the auxiliary prisms 70 and 80 be formed to have an isosceles-triangle cross-section having the vertex angle α and the vertex angle β, respectively, wherein the sum of the vertex angle α and the vertex angle β is 180 degrees ($\alpha+\beta=180°$). On the other hand, a side surface 84 of the auxiliary prism 80 which does not face the band-pass filter 54 and also the light incident surface 74 of the auxiliary prism 70 which faces the condenser lens 51, extend parallel to the light exit surface 65 of the central prism 60. In the case where the light incident surface 74 and the side surface 84 and the light exit surface 65 are angled relative to each other in such a manner, the incident laser beam on the light incident surface 74, the emergent laser beam from the light incident/exit surface 75, the emergent laser beam from the light exit surface 83 and the emergent laser beam from the light exit surface 65 are either parallel or perpendicular to one another, facilitating manufacture and inspection of the prisms 60, 70 and 80. The light receiving element 36 and the position detecting sensor 37 can be reversely positioned.

The semiconductor laser source 32 and the polarization beam splitter PBS are positioned so that S-polarized light of the modulated laser beam emitted by the semiconductor laser source 32 is reflected by the polarization beam splitter PBS. The S-polarized light, which is emitted from the semiconductor laser source 32 and subsequently collimated by the collimating lens 51 to be then reflected by the polarization beam splitter PBS, is projected towards the oppositely-positioned complementing optical communication apparatus via the second afocal optical system 40, the deflection mirror 20 and the telescopic optical system 10, in that order. On the other hand, the receiving laser beam that passes through the auxiliary prism 70, the central prism 60 and the auxiliary prism 80 of the transmitter-receiver unit 30 (via the telescopic optical system 10, the deflection mirror 20 and the second afocal optical system 40) is also a parallel beam, so that the problem of a polarization beam splitter changing its transmittance and reflectance in accordance with a variation in the angle of incidence of the incident light on the polarization beam splitter is prevented from occurring. The λ/4 retardation plate 34 is provided for changing the P-polarized light received from the complementing opposite optical communication apparatus into S-polarized light by rotating the plane of polarization of the incident laser beam by 90 degrees.

The integral transmitter-receiver optical communication apparatus having the aforementioned structure shown in FIG. 19 is utilized in a manner similar to a conventional integral transmitter-receiver optical communication apparatus. Namely, this optical communication apparatus is utilized by being generally positioned opposite to the semiconductor laser beam of a complementing optical communication apparatus having an identical structure, wherein the transmission range of the laser beam emitted by the semiconductor laser source 32 overlaps a laser beam emitted by a complementing semiconductor laser beam of the complementing optical communication apparatus, so that the laser beam modulated by the modulator 31 is received by the light receiving element 36 in each of the two mutually complementing optical communication apparatuses. Only the S-polarized laser beam of the laser beam emitted from the semiconductor laser source 32 to be reflected by the polarization beam splitting plane PBS emerges from the light incident/exit surface 75 after the incident laser beam on the light incident surface 74 is refracted through the prism 70 at an inclined angle with respect to a direction perpendicular to the optical axis of the incident laser beam on the light incident surface 74. Although the laser beam reflected by the polarization beam splitting plane PBS to proceed towards the deflection mirror 20 is also refracted in accordance with the angle of the light incident/exit surface 75 when emerging therefrom, the incident laser beam on the light incident surface 74 and the emergent laser beam from the light incident/exit surface 75 are positioned relative to each other by 90 degrees. The emergent laser beam which emerges from the light exit surface 75 of the auxiliary prism 70 is transmitted outwards via the second afocal optical system 40, the deflection mirror 20 and the telescopic optical system 10, in that order.

On the other hand, the P-polarized laser beam emitted from the oppositely-positioned complementing optical communication apparatus passes through the polarization beam splitting plane PBS to be received by the light receiving element 36 and the position detecting sensor 37 after being split into two separate beams by beam splitting plane BS. At this time, the incident laser beam on the light incident/exit surface 75 is refracted in accordance with the angle of inclination thereof, the emergent laser beam from the light exit surface 65 is also refracted in accordance with the angle of inclination thereof, and the emergent laser beam from the light exit surface 83 is also refracted in accordance with the angle of inclination thereof.

Accordingly, when light passes through any of the surfaces 65, 74, 75 or 83 of the prism 60, 70 or 80, the light is always refracted. Therefore, the direction of reflected light (including light that has already been reflected) at any refracting surface (phase boundary) deviates slightly from the direction towards either the light receiving element 36 or the position detecting sensor 37, so that such reflected light does not enter either the light receiving element 36 or the position detecting sensor 37. Consequently, the occurrence of crosstalk between the transmitting light and the receiving light can be prevented. In other words, the respective angles of the surface 65 of the central prism 60, the surfaces 74 and 75 of the auxiliary prism 70 and the surface 83 of the auxiliary prism 80 are determined so that any stray light may not enter either the light receiving element 36 or the position detecting sensor 37.

Figure 20:
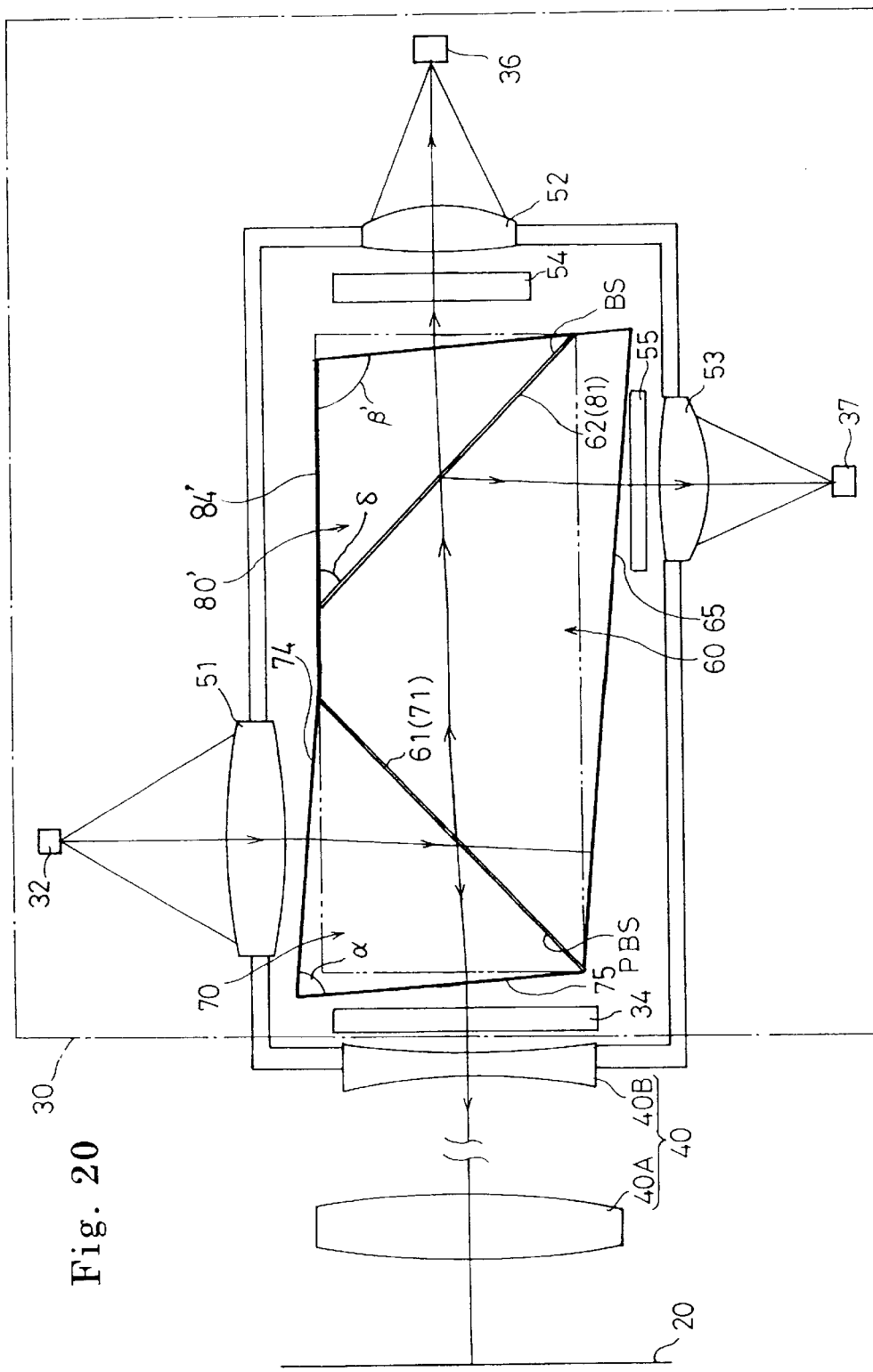
FIG. 20 is a cross sectional view of the second embodiment of the integral transmitter-receiver optical communication apparatus according to the fifth aspect of the present invention.

FIG. 20 shows the second embodiment of the integral transmitter-receiver optical communication apparatus according to the fifth aspect of the present invention. This embodiment is identical to the first embodiment shown in FIG. 19 except for the auxiliary prism 80' shown in FIG. 20 which corresponds to the auxiliary prism 80 of FIG. 19. In this embodiment shown in FIG. 20, the auxiliary prism 80' is formed such that a normal of a side surface 84', which corresponds to the side surface 84 shown in FIG. 19, extends perpendicular to each of the optical axes of the second afocal optical system 40 and the condenser lens 52. Furthermore, the side surface 84' is not parallel to the surface 65 of the central prism 60. In the auxiliary prism 80', the angle β of a corner is smaller than the angle β shown in FIG. 19 (β'=β−Δ). The angle δ of the top left corner of the auxiliary prism 80' in FIG. 20 is larger than that of the corresponding corner shown in FIG. 19 by an angle Δ (δ=(180°−β)/2+Δ). The angle of the remaining (lower right) corner is constant in FIGS. 19 and 20 ((180°−β)/2).

In this second embodiment of the integral transmitter-receiver optical communication apparatus according to the fifth aspect of the present invention, the side surface 84' can be utilized as a reference surface during assembly and/or an inspection thereof. Alternatively, a laser beam for inspection can be made incident on the side surface 84'.

Figure 21:
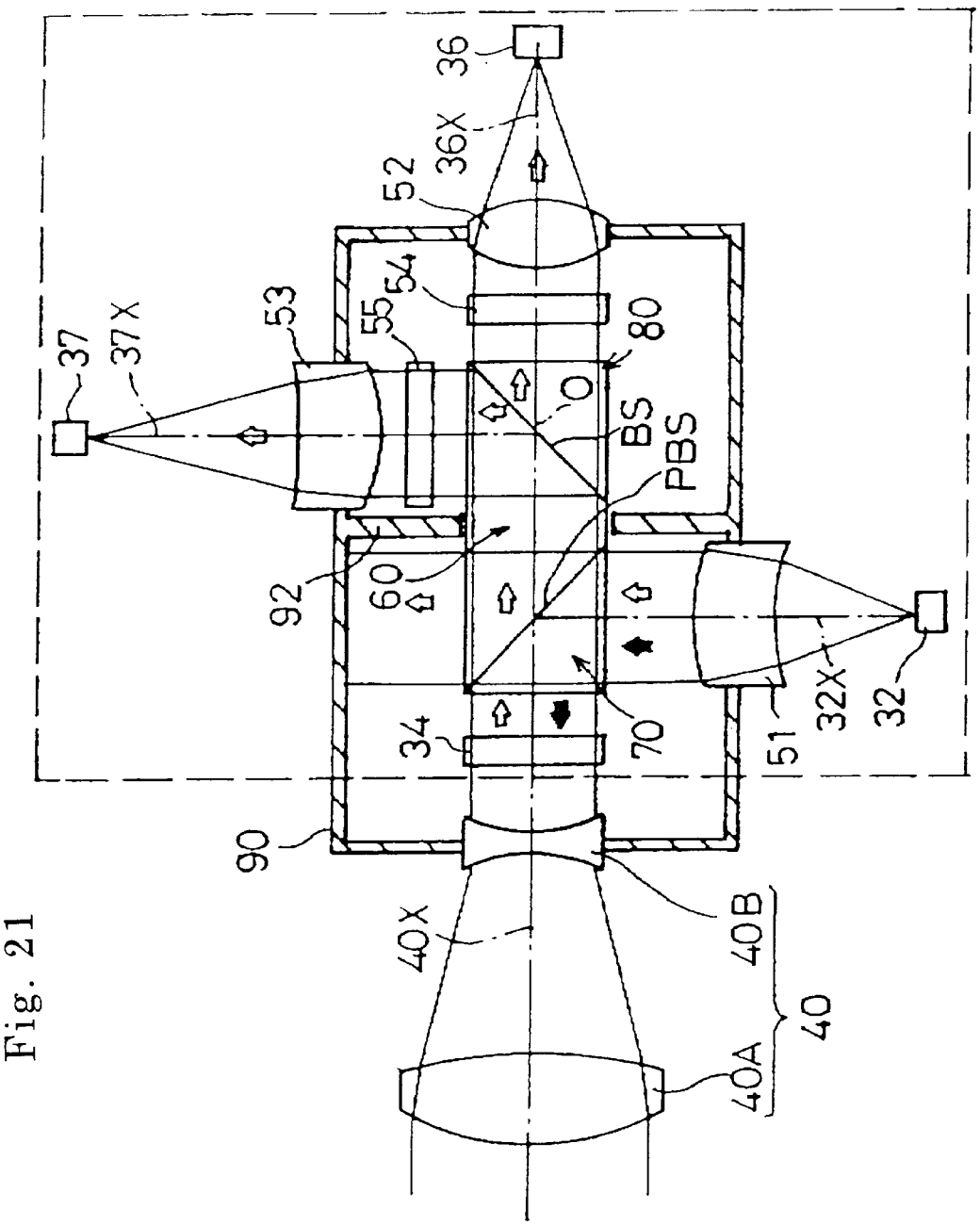
FIG. 21 is a cross sectional view of a comparative example of an integral transmitter-receiver optical communication apparatus which is compared with the embodiments shown in FIGS. 19 and 20.

FIG. 21 shows a comparative example of an integral transmitter-receiver optical communication apparatus which is compared with the first and second embodiments shown in FIGS. 19 and 20. In this comparative example, the auxiliary prisms 70 and 80 are right-angled prisms. In this case, since each side surface (light incident surface or light incident/exit surface) of the auxiliary prisms 70 and 80 are perpendicular to the corresponding optical axis, the direction of reflected light at a phase boundary between the prisms 70 and 80, and the surrounding air therearound, is parallel to the corresponding optical axis (i.e., the direction perpendicular to the phase boundary), so that the reflected light can finally enter either the light receiving element 36 or the position detecting sensor 37 as long as such reflected light continues to appear.

The respective angles (the angles α, β and β') of the light incident surface 74, the light incident/exit surface 75, the light exit surface 83 and the light exit surface 65 can be determined in accordance with the dimensions of the light receiving element 36 and the position detecting sensor 37, and the focal lengths of the condenser lenses 52 and 53, etc. For instance, crosstalk did not occur at all when the angles α, β were respectively set to 84 and 96 degrees (surface 65 being set parallel to surface 74) under the following conditions: the diameter of a light receiving area of the light receiving element 36 is 1 mm; the focal length of the condenser lens 52 is 15 mm; the minimum angle of deviation of the condenser lens 52 is 2.1°; the area of a light sensing area of the position detecting sensor is 5 mm by 5 mm; the focal length of the condenser lens 53 is 26.6 mm; and the minimum angle of deviation of the condenser lens 53 is 5.5°.

Figure 22:
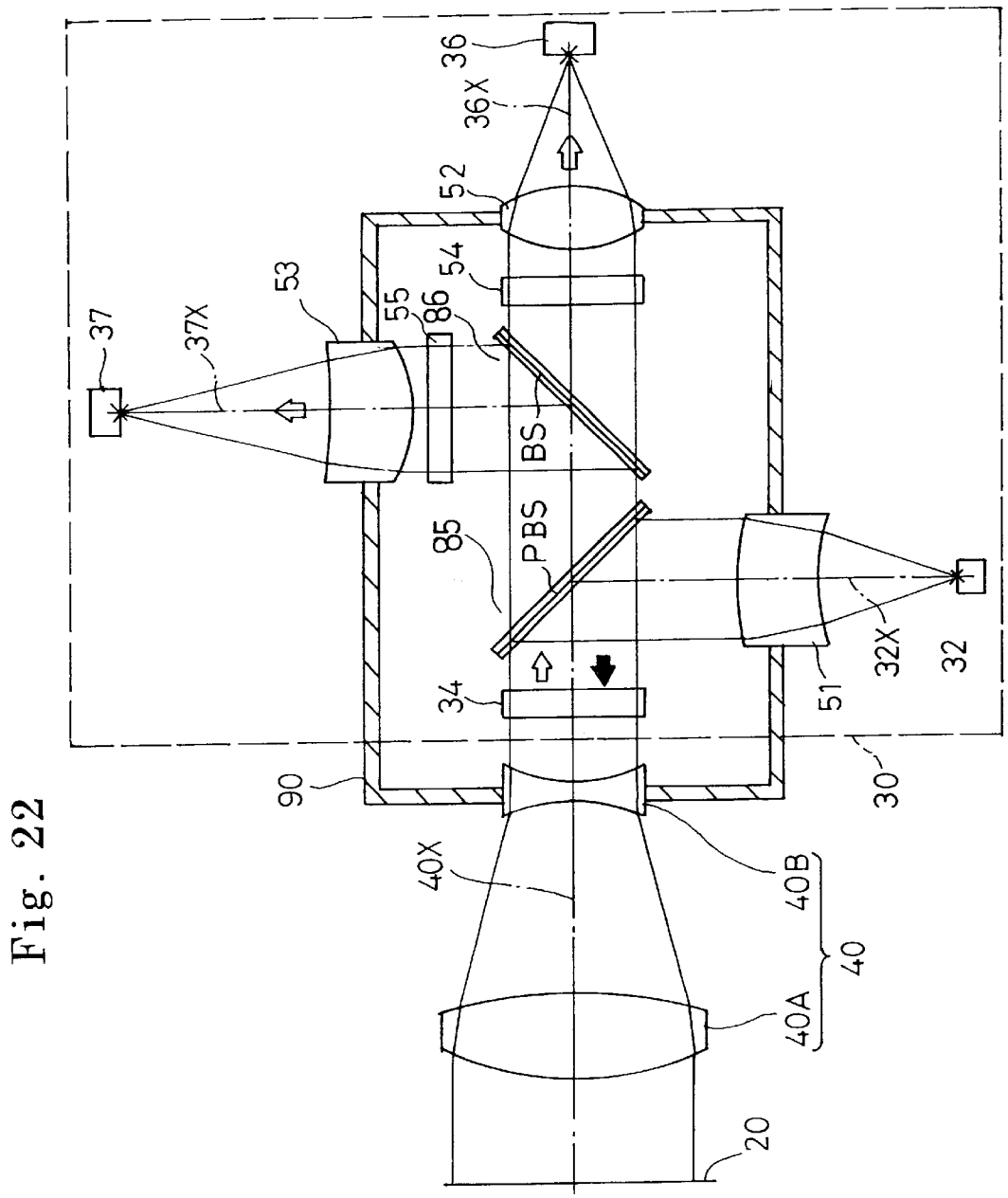
FIG. 22 is a cross sectional view of the first embodiment of the integral transmitter-receiver optical communication apparatus according to the sixth aspect of the present invention.

FIG. 22 shows the first embodiment of the integral transmitter-receiver optical communication apparatus according to the sixth aspect of the present invention. In FIG. 22, members or elements similar to those shown in FIG. 24 are designated by the same reference designators. This embodiment of the optical communication apparatus is provided between the deflection mirror 20 and the transmitter-receiver unit 30 with a second afocal optical system 40. The second afocal optical system 40 includes a first lens group 40A having a positive power and a second lens group 40B having a negative power, in this order from the deflection mirror 20 to the transmitter-receiver unit 30. The second afocal optical system 40 is an optical system of zero convergent power, whose focal points are infinitely distant, so that the light beam which emerges from the second afocal optical system 40 is a substantially parallel beam if the light beam which enters the second afocal optical system 40 is a substantially parallel beam. However, the beam diameter of the light beam incident on the second afocal optical system is decreased therethrough in the direction from the object side to the transmitter-receiver unit 30.

The reduction ratio of the diameter (magnification) of the telescopic optical system (i.e., first afocal optical system) 10 can be set to a ratio of approximately one to four (four times), while the reduction ratio of the diameter (magnification) of the second afocal optical system 40 can be made to be a ratio of approximately one to two (two times).

In this embodiment shown in FIG. 22, the transmitter-receiver unit 30 is provided therein with a polarizing plate 85 and a beam splitting plate 86. These plates 85 and 86 are surrounded by the air (space) within the casing 90. The polarizing plate 85 and the beam splitting plate 86 are substitutes for the polarization beam splitter 33 and the beam splitter 35 shown in FIG. 24 which are formed by connecting a plurality of prisms using an adhesive, respectively. The polarizing plate 85 includes a transparent parallel plate as a base, and a polarization beam splitting plane PBS formed on the transparent parallel plate by forming a polarization beam splitting thin layer on the transparent parallel plate. The polarizing plate 85 is positioned so that the polarization beam splitting plane PBS is positioned at 45 degrees with respect to each of the optical axes 32X and 40X of the semiconductor laser source 32 and the second afocal optical system 40. The beam splitting plate 86 includes a transparent parallel plate as a base, and a beam splitting plane BS formed on the transparent parallel plate by forming a beam splitting thin layer on the transparent parallel plate. The beam splitting plate 86 is positioned so that the beam splitting plane BS is angled relative to each of the optical axes 37X and 40X (36X) of the position detecting sensor 37 and the second afocal optical system 40 by 45 degrees.

A collimating lens 51 for collimating the laser beam emitted from the semiconductor laser source 32 is positioned on the optical axis 32X of the semiconductor laser source 32. A condenser lens 52 for focusing the receiving parallel beam on the light receiving element 36 and a band-pass filter 54 are positioned on the optical axis 36X of the light receiving element 36. A condenser lens 53 for focusing the receiving parallel beam on the light receiving element 37 and a band-pass filter 55 are positioned on the optical axis 37X of the position detecting sensor 37. The locations of the light receiving element 36 and the position detecting sensor 37 can be exchanged.

The semiconductor laser source 32 and the polarization beam splitter PBS of the polarizing plate 85 are positioned so that S-polarized light of the modulated laser beam emitted by the semiconductor laser source 32 is reflected by the polarization beam splitting plane PBS. The S-polarized light, which is emitted from the semiconductor laser source 32 and subsequently collimated by the collimating lens 51 to be then reflected by the polarization beam splitter PBS, is projected towards the oppositely-positioned complementing optical communication apparatus via the second afocal optical system 40, the deflection mirror 20 and the telescopic optical system 10, in that order. On the other hand, the receiving laser beam that passes through the polarization beam splitting plane PBS of the polarizing plate 85 and the beam splitting plane BS of the beam splitting plate 86 via the telescopic optical system 10, the deflection mirror 20 and the second afocal optical system 40 (in that order) is also a parallel beam, so that the problem of a polarization beam splitter changing its transmittance and reflectance in accordance with a variation in the angle of incidence of the incident light on the polarization beam splitter is prevented from occurring. The λ/4 retardation plate 34 is provided for changing the P-polarized light received from the complementing optical communication apparatus into S-polarized light by rotating the plane of polarization of the incident laser beam by 90 degrees.

The integral transmitter-receiver optical communication apparatus having the aforementioned structure shown in FIG. 22 is utilized in a manner similar to a conventional integral transmitter-receiver optical communication apparatus. Namely, this embodiment of the optical communication apparatus, shown in FIG. 22, is utilized by being generally positioned opposite to a complementing semiconductor laser beam of a complementing optical communication apparatus having an identical structure, wherein the transmission range of the laser beam emitted by the semiconductor laser source 32 overlaps a laser beam emitted by the complementing semiconductor laser beam of the complementing optical communication apparatus, so that the laser beam modulated by the modulator 31 is received by the light receiving element 36 in each of the two mutually complementing optical communication apparatuses. The laser beam emitted from the semiconductor laser source 32 is incident on the polarizing plate 85, so that only S-polarized laser beam is reflected by the polarization beam splitting plane PBS of the polarizing plate 85 to be projected towards the oppositely-positioned complementing optical communication apparatus via the second afocal optical system 40, the deflection mirror 20 and the telescopic optical system 10, in that order. On the other hand, the receiving laser beam is incident on and then passes through the polarizing plate 85 via the telescopic optical system 10, the deflection mirror 20 and the second afocal optical system 40 (in that order) to enter the beam splitting plate 86, and the light which enters the beam splitting plate 86 is split into two separate beams by the beam splitting plane BS to be respectively received by the light receiving element 36 and the position detecting sensor 37.

In the integral transmitter-receiver optical communication apparatus according to the sixth aspect of the present invention, since the polarizing plate 85 and the beam splitting plate 86 are used instead of using prisms corresponding to the polarization beam splitter 33 and the beam splitter 35 shown in FIG. 24, crosstalk which may be caused by reflected light at any light incident surface or light incident/exit surface of prisms having adhesive surfaces does not occur. Consequently, transmitting and receiving signals having a high SN ratio can be obtained.

Figure 23:
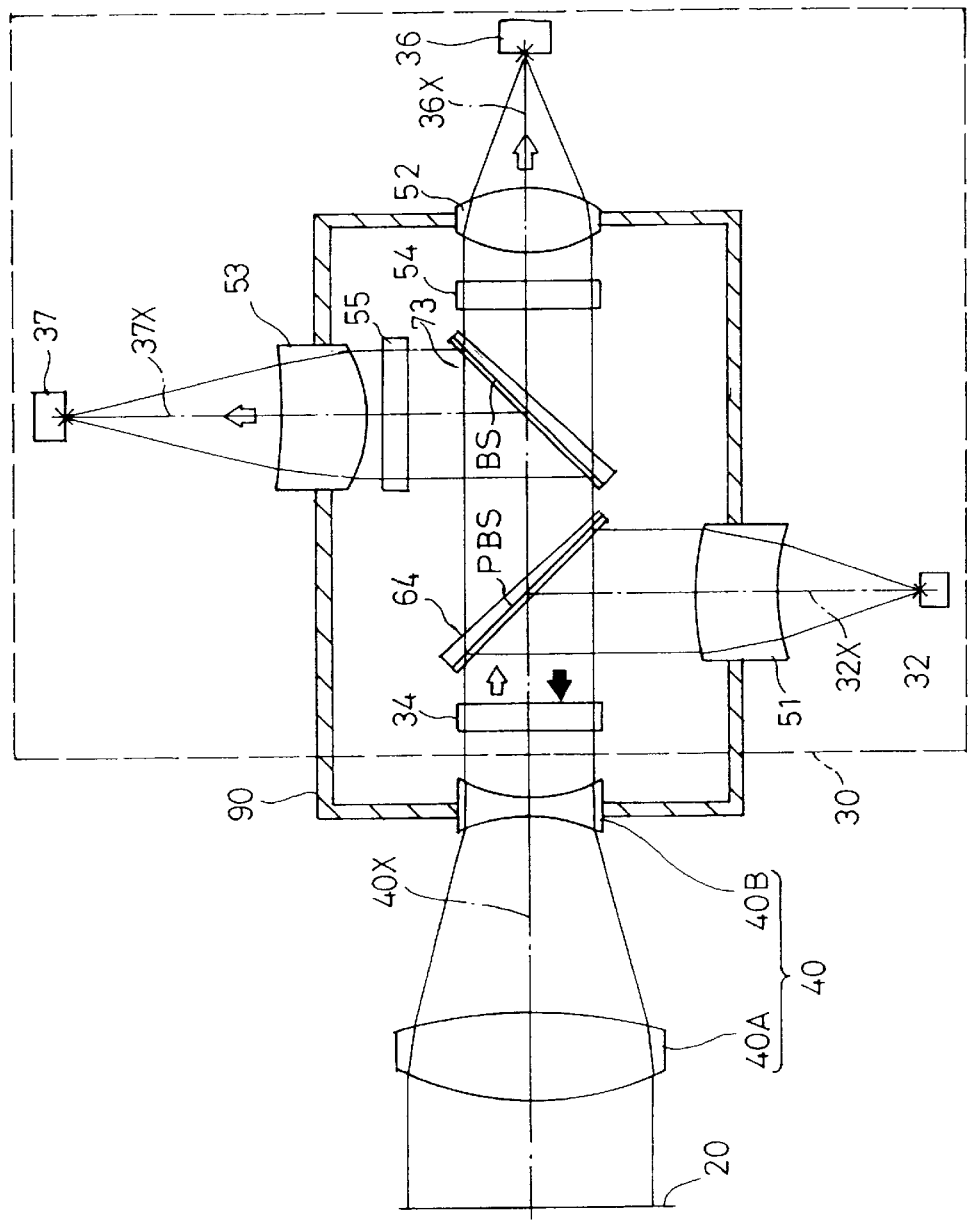
FIG. 23 is a cross sectional view of the second embodiment of the integral transmitter-receiver optical communication apparatus according to the sixth aspect of the present invention.

FIG. 23 shows the second embodiment of the integral transmitter-receiver optical communication apparatus according to the sixth aspect of the present invention. This embodiment is identical to the previous embodiment shown in FIG. 22 except for the shape of the polarizing plate 85 and the beam splitting plate 86. Namely, in the embodiment shown in FIG. 23, the base of the polarizing plate 85 is a non-parallel plate having a wedge-shaped cross section. Likewise, the base of the beam splitting plate 86 is also a non-parallel plate having a wedge-shaped cross section. With this structure, the undesirable influence upon the transmitting and receiving laser beam that is caused by stray light reflected by the rear surface of the base of either the polarizing plate 85 or the beam splitting plate 86 can be reduced.

As can be understood from the foregoing, an integral transmitter-receiver optical communication apparatus having superior cost-performance without requiring excessive high quality, wherein the light deflecting optical system and the following optical systems provided after the light deflecting optical system can be miniaturized without sacrificing the image quality, can be obtained. Moreover, according to the present invention, due to the positional relationship among the semiconductor laser source, the position detecting sensor and the light receiving element in the transmitter-receiver unit and also the positional relationship between the first optical system (i.e., the telescopic optical system) and the second afocal optical system 40, an integral transmitter-receiver optical communication apparatus which is small and compact can be obtained. Furthermore, in an integral transmitter-receiver optical communication apparatus, the peripheral edge of a cross section of the transmitting laser beam which is transmitted to the oppositely-positioned complementing apparatus via the telescopic optical system 10 is sharp, which facilitates the operation of adjusting the direction of the laser beam transmitted by one of the two mutually complementing apparatuses relative to the other. Furthermore, the occurrence of crosstalk between the transmitting light and the receiving light can be prevented.

Obvious changes may be made in the specific embodiments of the present invention described herein, such modifications being within the spirit and scope of the invention claimed. It is indicated that all matter contained herein is illustrative and does not limit the scope of the present invention.

What is claimed is:

1. An integral transmitter-receiver optical communication apparatus, comprising:

a transmitter-receiver device comprising: a transmitter having a laser source for emitting a laser beam modulated in accordance with a transmission information signal; a receiver having a position detecting sensor and a light receiving element each of which receives a complementing modulated laser beam transmitted from a complementing transmitter; and a beam splitting device for splitting said modulated laser beam and said complementing modulated laser beam, which are incident thereon, into two separate laser beams;

a telescopic optical system for transmitting said modulated laser beam emitted by said laser source, and for receiving said complementing modulated laser beam transmitted from said complementing transmitter, said telescopic optical system comprising a first afocal optical system;

a light beam deflecting device positioned between said telescopic optical system and said transmitter-receiver device, wherein said light beam deflecting device is controlled in accordance with a signal output from said position detecting sensor, and said light beam deflecting device comprises a deflection mirror; and a second afocal optical system positioned between said deflection mirror and said transmitter-receiver device;

wherein said first afocal optical system can decrease the beam diameter of a laser beam when said first afocal optical system is moved in a direction from the object side to said deflection mirror, said second afocal optical system can decrease the beam diameter of a laser beam when said second afocal optical system is moved in a direction from said deflection mirror to said transmitter-receiver device, and wherein the following condition is satisfied:

$$m < 2(\theta 3/\theta 1)$$

wherein

"m" represents the magnification of said first afocal optical system,

"θ1" represents the maximum off-axis incident angle of an incident ray on said first afocal optical system, and "θ3" represents the maximum angle of rotation of said deflection mirror.

2. The integral transmitter-receiver optical communication apparatus according to claim 1, wherein the magnification of said second afocal optical system is equal to, or less than, half of the magnification of said first afocal optical system.

3. The integral transmitter-receiver optical communication apparatus according to claim 1, wherein said deflection mirror comprises a single deflection mirror which can be driven about two axes which are orthogonal to each other.

4. The integral transmitter-receiver optical communication apparatus according to claim 1, wherein said deflection mirror comprises two deflection mirrors which are driven about two orthogonal axes, respectively.

5. The integral transmitter-receiver optical communication apparatus according to claim 1, wherein the magnification of said second afocal optical system is less than the magnification of said first afocal optical system.

6. The integral transmitter-receiver optical communication apparatus according to claim 1, wherein said beam splitting device comprises a polarization beam splitting plane and a beam splitting plane.

* * * * *